(12) United States Patent
Kondow

(10) Patent No.: US 10,104,372 B2
(45) Date of Patent: Oct. 16, 2018

(54) IMAGE PROCESSING APPARATUS AND IMAGE PROCESSING METHOD

(75) Inventor: Kenji Kondow, Tokyo (JP)

(73) Assignee: SONY CORPORATION, Tokyo (JP)

( * ) Notice: Subject to any disclaimer, the term of this patent is extended or adjusted under 35 U.S.C. 154(b) by 337 days.

(21) Appl. No.: 14/118,609

(22) PCT Filed: Jun. 21, 2012

(86) PCT No.: PCT/JP2012/065819
§ 371 (c)(1),
(2), (4) Date: Nov. 19, 2013

(87) PCT Pub. No.: WO2013/002110
PCT Pub. Date: Jan. 3, 2013

(65) Prior Publication Data
US 2014/0079122 A1  Mar. 20, 2014

(30) Foreign Application Priority Data

Jun. 30, 2011 (JP) .................. 2011-145566

(51) Int. Cl.
| H04N 19/13 | (2014.01) |
| H04N 19/50 | (2014.01) |
| H04N 19/176 | (2014.01) |
| H04N 19/593 | (2014.01) |
| H04N 19/463 | (2014.01) |
| H04N 19/157 | (2014.01) |

(52) U.S. Cl.
CPC ........ *H04N 19/00569* (2013.01); *H04N 19/13* (2014.11); *H04N 19/157* (2014.11); *H04N 19/176* (2014.11); *H04N 19/463* (2014.11); *H04N 19/593* (2014.11)

(58) Field of Classification Search
CPC .............................. H04N 19/00569
USPC ....................................... 375/240.12
See application file for complete search history.

(56) References Cited

U.S. PATENT DOCUMENTS

| 2011/0007673 A1* | 1/2011 | Ahn ...................... H04L 1/1607 370/280 |
| 2011/0090967 A1* | 4/2011 | Chen ...................... H04N 19/70 375/240.16 |
| 2013/0028326 A1* | 1/2013 | Moriya ................ H04N 19/176 375/240.16 |

FOREIGN PATENT DOCUMENTS

| JP | 2003-324731 | 11/2003 |
| JP | 2011-259361 | 12/2011 |
| JP | 2012-023613 | 2/2012 |

OTHER PUBLICATIONS

Taichiro Shiodera, et al., TE6 subset a: Bidirectional intra prediction, JCT-VC of ITU-T SG16 WP3 and ISO/IEC JTC1/SC29/WG11, Oct. 7-15, 2010, pp. 1-10, Guangzhou, CN.*

(Continued)

*Primary Examiner* — Jonathan Messmore
(74) *Attorney, Agent, or Firm* — Paratus Law Group, PLLC

(57) ABSTRACT

The present technique relates to an image processing apparatus and an image processing method which allow the encoding efficiency to be improved. The image processing apparatus includes: a control unit that controls encoding of various parameters related to intra prediction in accordance with a size and a shape of a prediction unit that is a region in a prediction processing unit by selecting a table and setting a context probability model, and an encoding unit that encodes the parameters according to control by the control unit. The present disclosure can be applied to an image processing apparatus.

13 Claims, 32 Drawing Sheets

(56) References Cited

OTHER PUBLICATIONS

Taichiro Shiodera, et al., TE6 subset a: Bidirectional intra prediction, Joint Collaborative Team on Video Coding (JCT-VC) of ITU-T SG16 WP3 and ISO/IEC JTC1/SC29/WG11, Oct. 7-15, 2010, pp. 1-10, $3^{rd}$ Meeting: Guangzhou, CN.

Thomas Wiegand, WD1: Working Draft 1 of High-Efficiency Video Coding, Joint Collaborative Team on Video Coding (JCT-VC) of ITU-T SG16 WP3 and ISO/IEC JTC1/SC29/WG11, Oct. 7-15, 2010, pp. 1-137, $3^{rd}$ Meeting: Guangzhou, CN.

Jan. 16, 2017, CN communication issued for related CN application No. 201280030984.7.

May 24, 2016, Chinese Office Action for related CN Application No. 201280030984.7.

\* cited by examiner

| CU size | Partition type | mpm_flag = 0 | mpm_flag = 1 |
|---|---|---|---|
| >=32 | 2Nx2N | 0 | 1 |
| | NxN | 0 | 1 |
| | 2NxhN | 1 | 0 |
| | hNx2N | 1 | 0 |
| <32 | 2Nx2N | 1 | 0 |
| | NxN | 1 | 0 |
| | 2NxhN | 1 | 0 |
| | hNx2N | 1 | 0 |

FIG. 10

| Partition id | Partition type | mpm_lr_flag=0 | mpm_lr_flag=1 |
|---|---|---|---|
| 0 | 2Nx2N | 0 | 1 |
| | NxN | 0 | 1 |
| | 2NxhN | 0 | 1 |
| | hNx2N | 1 | 0 |
| 0 | 2Nx2N | — | — |
| | NxN | 0 | 1 |
| | 2NxhN | — | — |
| | hNx2N | — | — |

FIG. 11

| Partition type | CU size > 32 | CU size <= 32 |
|---|---|---|
| 2Nx2N, NxN | TABLE A | TABLE A |
| 2NxhN | TABLE D | TABLE B |
| hNx2N | TABLE E | TABLE C |

FIG. 12

| \multicolumn{3}{c}{TABLE A} | | |
|---|---|---|
| number | mode | codeword |
| 0 | VER | 00000 |
| 1 | HOR | 00001 |
| 2 | DC | 00010 |
| 3 | VER−8 | 00011 |
| 4 | VER−4 | MPM |
| 5 | VER+4 | 00100 |
| 6 | VER+8 | 00101 |
| 7 | HOR−4 | 00110 |
| 8 | HOR+4 | 00111 |
| 9 | HOR+8 | 01000 |
| 10 | VER−6 | 01001 |
| 11 | VER−2 | 01010 |
| 12 | VER+2 | 01011 |
| 13 | VER+6 | 01100 |
| 14 | HOR−6 | 01101 |
| 15 | HOR−2 | 01110 |
| 16 | HOR+2 | 01111 |
| 17 | HOR+6 | 10000 |
| 18 | VER−7 | 10001 |
| 19 | VER−5 | 10010 |
| 20 | VER−3 | 10011 |
| 21 | VER−1 | 10100 |
| 22 | VER+1 | 10101 |
| 23 | VER+3 | 10110 |
| 24 | VER+5 | 10111 |
| 25 | VER+7 | 11000 |
| 26 | HOR−7 | 11001 |
| 27 | HOR−5 | 11010 |
| 28 | HOR−3 | 11011 |
| 29 | HOR−1 | 11100 |
| 30 | HOR+1 | 11101 |
| 31 | HOR+3 | 11110 |
| 32 | HOR+5 | 111110 |
| 33 | HOR+7 | 111111 |

FIG. 13

| TABLE B | | |
|---|---|---|
| number | mode | codeword |
| 1 | HOR | 0000 |
| 29 | HOR-1 | 0001 |
| 30 | HOR+1 | 0010 |
| 15 | HOR-2 | 0011 |
| 16 | HOR+2 | 0100 |
| 28 | HOR-3 | 0101 |
| 31 | HOR+3 | 0110 |
| 7 | HOR-4 | 0111 |
| 8 | HOR+4 | 100000 |
| 27 | HOR-5 | 100001 |
| 32 | HOR+5 | 100010 |
| 14 | HOR-6 | 100011 |
| 17 | HOR+6 | 100100 |
| 26 | HOR-7 | 100101 |
| 33 | HOR+7 | 100110 |
| 3 | VER-8 | 100111 |
| 9 | HOR+8 | 101000 |
| 2 | DC | 101001 |
| 0 | VER | 101010 |
| 4 | VER-4 | MPM |
| 5 | VER+4 | 101011 |
| 6 | VER+8 | 101100 |
| 10 | VER-6 | 101101 |
| 11 | VER-2 | 101110 |
| 12 | VER+2 | 101111 |
| 13 | VER+6 | 110000 |
| 18 | VER-7 | 110001 |
| 19 | VER-5 | 110010 |
| 20 | VER-3 | 110011 |
| 21 | VER-1 | 110100 |
| 22 | VER+1 | 110101 |
| 23 | VER+3 | 110110 |
| 24 | VER+5 | 1101110 |

FIG. 14

TABLE C

| number | mode | codeword |
|---|---|---|
| 0 | VER | 0000 |
| 21 | VER−1 | 0001 |
| 22 | VER+1 | MPM |
| 11 | VER−2 | 0010 |
| 12 | VER+2 | 0011 |
| 20 | VER−3 | 0100 |
| 23 | VER+3 | 0101 |
| 4 | VER−4 | 0110 |
| 5 | VER+4 | 0111 |
| 19 | VER−5 | 100000 |
| 24 | VER+5 | 100001 |
| 10 | VER−6 | 100010 |
| 13 | VER+6 | 100011 |
| 18 | VER−7 | 100100 |
| 25 | VER+7 | 100101 |
| 3 | VER−8 | 100110 |
| 6 | VER+8 | 100111 |
| 2 | DC | 101000 |
| 1 | HOR | 101001 |
| 7 | HOR−4 | 101010 |
| 8 | HOR+4 | 101011 |
| 9 | HOR+8 | 101100 |
| 14 | HOR−6 | 101101 |
| 15 | HOR−2 | 101110 |
| 16 | HOR+2 | 101111 |
| 17 | HOR+6 | 110000 |
| 26 | HOR−7 | 110001 |
| 27 | HOR−5 | 110010 |
| 28 | HOR−3 | 110011 |
| 29 | HOR−1 | 11000 |
| 30 | HOR+1 | 110101 |
| 31 | HOR+3 | 110110 |
| 32 | HOR+5 | 1101110 |
| 33 | HOR+7 | 1101111 |

FIG. 15

TABLE D

| number | mode | codeword |
|---|---|---|
| 1 | HOR | 000 |
| 29 | HOR-1 | 001 |
| 30 | HOR+1 | 010 |
| 15 | HOR-2 | 011 |
| 16 | HOR+2 | 1000 |
| 28 | HOR-3 | 1001 |
| 31 | HOR+3 | 1010 |
| 7 | HOR-4 | 1011 |
| 8 | HOR+4 | 11000 |
| 27 | HOR-5 | 11001 |
| 32 | HOR+5 | 11010 |
| 14 | HOR-6 | 11011 |
| 17 | HOR+6 | 111000 |
| 26 | HOR-7 | 111001 |
| 33 | HOR+7 | 111010 |
| 3 | VER-8 | 111011 |
| 9 | HOR+8 | 1111000 |
| 2 | DC | 1111001 |
| 0 | VER | 1111010 |
| 4 | VER-4 | MPM |
| 5 | VER+4 | 1111011 |
| 6 | VER+8 | 11111000 |
| 10 | VER-6 | 11111001 |
| 11 | VER-2 | 11111010 |
| 12 | VER+2 | 11111011 |
| 13 | VER+6 | 111111000 |
| 18 | VER-7 | 111111001 |
| 19 | VER-5 | 111111010 |
| 20 | VER-3 | 1111110 |
| 21 | VER-1 | 1111111000 |
| 22 | VER+1 | 1111111001 |
| 23 | VER+3 | 1111111010 |
| 24 | VER+5 | 1111111011 |
| 25 | VER+7 | 1111111100 |

FIG. 16

| TABLE E | | |
|---|---|---|
| number | mode | codeword |
| 0 | VER | 000 |
| 21 | VER-1 | 001 |
| 22 | VER+1 | MPM |
| 11 | VER-2 | 010 |
| 12 | VER+2 | 011 |
| 20 | VER-3 | 1000 |
| 23 | VER+3 | 1001 |
| 4 | VER-4 | 1010 |
| 5 | VER+4 | 1011 |
| 19 | VER-5 | 11000 |
| 24 | VER+5 | 11001 |
| 10 | VER-6 | 11010 |
| 13 | VER+6 | 11011 |
| 18 | VER-7 | 111000 |
| 25 | VER+7 | 111001 |
| 3 | VER-8 | 111010 |
| 6 | VER+8 | 111011 |
| 2 | DC | 1111000 |
| 1 | HOR | 1111001 |
| 7 | HOR-4 | 1111010 |
| 8 | HOR+4 | 1111011 |
| 9 | HOR+8 | 11111000 |
| 14 | HOR-6 | 11111001 |
| 15 | HOR-2 | 11111010 |
| 16 | HOR+2 | 11111011 |
| 17 | HOR+6 | 111111000 |
| 26 | HOR-7 | 111111001 |
| 27 | HOR-5 | 111111010 |
| 28 | HOR-3 | 111111011 |
| 29 | HOR-1 | 1111111000 |
| 30 | HOR+1 | 1111111001 |
| 31 | HOR+3 | 1111111010 |
| 32 | HOR+5 | 1111111011 |
| 33 | HOR+7 | 1111111100 |

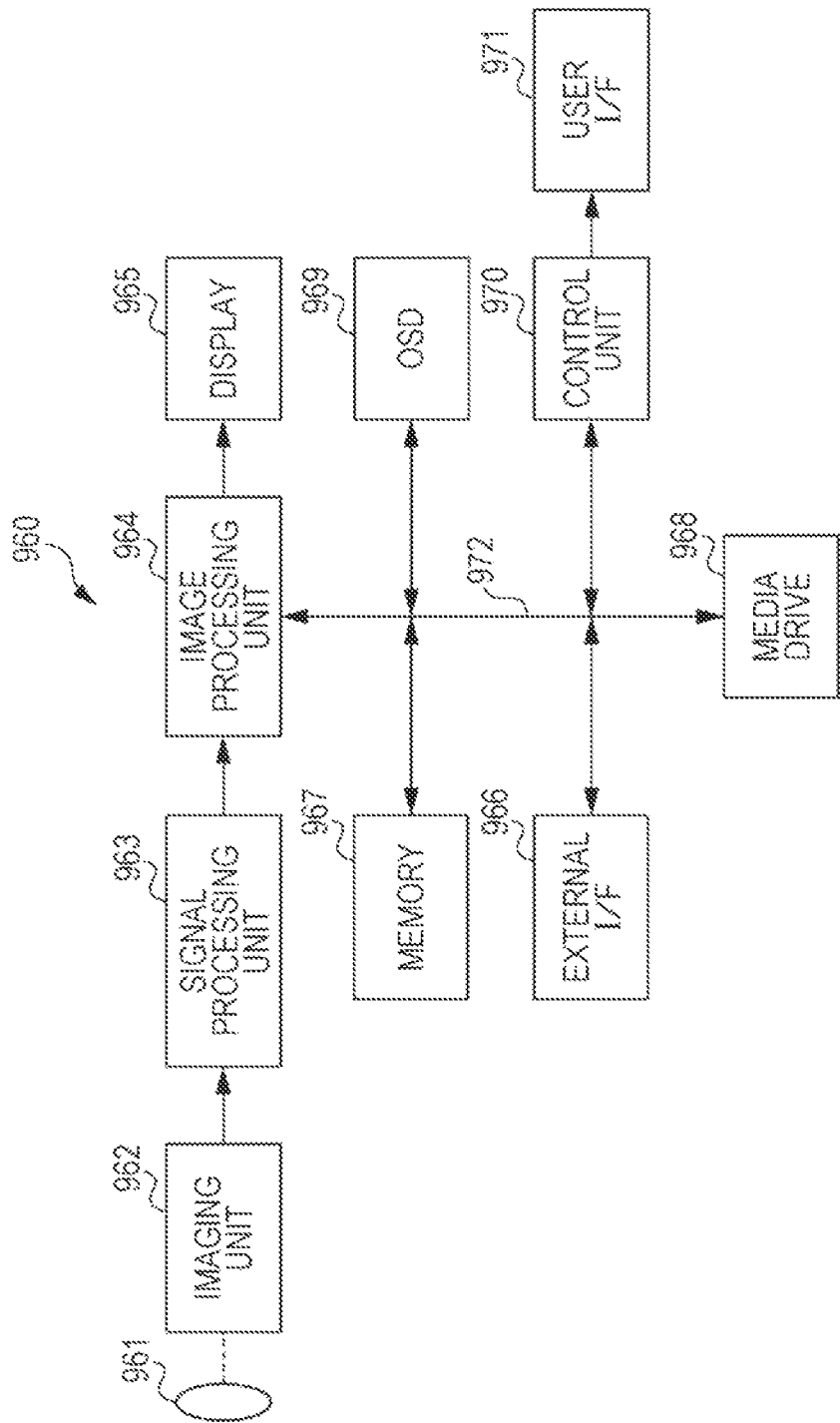

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2012/065819 (filed on Jun. 21, 2012) under 35 U.S.C. § 371, which claims priority to Japanese Patent Application No. 2011-145566 (filed on Jun. 30, 2011), which are all hereby incorporated by reference in their entirety.

TECHNICAL FIELD

The present disclosure relates to an image processing apparatus and an image processing method, particularly to an image processing apparatus and an image processing method by which encoding efficiency can be improved.

BACKGROUND ART

In recent years, an apparatus conforming to an MPEG (Moving Picture Experts Group) scheme and the like is becoming widespread in both broadcast stations which distribute information and ordinary households which receive information, where the MPEG scheme treats image information as digital and compresses the information, for the purpose of efficiently transmitting and storing information, by means of an orthogonal transform such as a discrete cosine transform and motion compensation while exploiting redundancy specific to the image information.

MPEG-2 (ISO (International Organization for Standardization)/IEC (International Electrotechnical Commission) 13818-2), in particular, is defined as a general-purpose image encoding system that is a standard covering both an interlaced scan image and a progressive scan image as well as images with a standard resolution and a high resolution. The MPEG-2 is now used widely in a wide range of applications for use by professionals and consumers. The use of the MPEG-2 compression scheme can realize a high compression ratio and satisfactory image quality by assigning a code amount (bit rate) of 4 to 8 Mbps to an interlaced scan image with a standard resolution having 720×480 pixels, or 18 to 22 Mbps to an interlaced scan image with a high resolution having 1920×1088 pixels, for example.

The MPEG-2 has targeted high image-quality encoding adapted mainly for broadcasting, but has not been suited for an encoding system with a code amount (bit rate) lower than that of MPEG-1, namely, an encoding system with a higher compression ratio. The need for such encoding system is expected to increase in the future as a mobile terminal is coming into wide use. In response, an MPEG-4 encoding system has been standardized. With regards to the image encoding system, the standard was approved as an international standard ISO/IEC 14496-2 in December, 1998.

Furthermore, a standard named H.26L (ITU-T (International Telecommunication Union Telecommunication Standardization Sector) Q6/16 VCEG (Video Coding Expert Group)), which is initially intended for encoding an image used in a television conference, has been in the process of becoming standardized in recent years. While requiring a greater amount of calculation in encoding and decoding compared to the conventional encoding systems such as the MPEG-2 and the MPEG-4, the H.26L is known to achieve higher encoding efficiency. As a part of the actions pertaining to the MPEG-4, moreover, a standardization achieving yet higher encoding efficiency by using the H.26L as a base and incorporating a function not supported in the H.26L has currently been in the process as Joint Model of Enhanced-Compression Video Coding.

The standard became an international standard in March, 2003 under the name of H.264 and MPEG-4 Part 10 (Advanced Video Coding; hereinafter noted as AVC) regarding the standardization schedule.

Further, as an extended activity, the standardization of FRExt (Fidelity Range Extension) including a coding tool necessary for business use such as RGB, 4:2:2, or 4:4:4, 8×8DCT (Discrete Cosine Transform) and quantization matrix stipulated by MPEG-2 has been completed in February, 2005, whereby AVC can be used as an encoding system capable of suitably expressing even film noise included in movies, and has come to be employed for a wide range of applications such as Blu-Ray Disc (registered trademark) and the like.

However, nowadays, needs for further high-compression encoding have been increased, such as intending to compress an image having around 4000×2000 pixels, which is quadruple of a high-vision image, or alternatively, needs for further high-compression encoding have been increased, such as intending to distribute a high-vision image within an environment with limited transmission capacity like the Internet. Therefore, with the above-mentioned VCEG (Video Coding Expert Group) under the control of ITU-T, studies relating to improvement of encoding efficiency have been continuously performed.

However, it was concerned that a macroblock size of 16 pixels×16 pixels was not optimal for a large picture frame provided in UHD (Ultra High Definition; 4000 pixels×2000 pixels) which is to be the target for a next-generation encoding system.

Accordingly, a JCTVC (Joint Collaboration Team-Video Coding) that is a joint standardization group formed by the ITU-T and the ISO/IEC is currently working to standardize an encoding system called an HEVC (High Efficiency Video Coding) for the purpose of further improving the encoding efficiency achieved by the AVC (refer to Non-Patent Document 1, for example).

The HEVC encoding system defines a coding unit (CU) as a processing unit similar to the macroblock used in the AVC. Unlike the macroblock used in the AVC, the size of the CU is not fixed to 16×16 pixels but specified within image compression information in each sequence.

By the way, in HEVC, an encoding system called most probable mode (MPM) can be used. In this mode, the encoder includes, in the stream, a flag mpm_flag that specifies whether the MPM is used for a PU of interest (prediction unit) to be processed and mpm_lr_flag that indicates which intra prediction direction of adjacent PU is applied to the PU of interest.

In contrast, when the MPM is not used, the encoder includes intra_dir_mode that indicates a prediction direction of intra prediction of the PU of interest in the stream.

The decoder decodes the stream, and decodes encoded data by a decoding method corresponding to the encoding system based on the information.

CITATION LIST

Non-Patent Document

Non-Patent Document 1: Thomas Wiegand, Woo-Jin Han, Benjamin Bross, Jens-Rainer Ohm, Gary J. Sullivan, "Working Draft 1 of High-Efficiency Video Coding", JCTVC-C403, Joint Collaborative Team on Video Coding (JCT-VC) of ITU-T SG16 WP3 and ISO/IEC JTC1/SC29/WG113rd Meeting: Guangzhou, CN, 7-15 October, 2010.

SUMMARY OF THE INVENTION

Problems to be Solved by the Invention

However, in this case, it is necessary to encode and include information such as mpm_flag, mpm_lr_flag, and intra_dir_mode in the stream, and therefore, there is a concern that these pieces of information may reduce the encoding efficiency. However, the encoding is performed without consideration of characteristics of these values, and therefore it is difficult to obtain sufficient encoding efficiency.

The present disclosure has been made in view of the foregoing, and an objective is to suppress reduction in encoding efficiency.

Solutions to Problems

One aspect of the present disclosure is an image processing apparatus including a control unit that controls encoding of a parameter related to intra prediction in accordance with a region in a prediction processing unit, and an encoding unit that encodes the parameter according to control by the control unit.

The control unit can control encoding of the parameter so as to decrease a code amount of the parameter.

The control unit can select a table for allocating a code number to each value of the parameter, and the encoding unit can convert and encode the value of the parameter into the code number using the table selected by the control unit.

The control unit can select a context probability model of arithmetic encoding by the encoding unit, and the encoding unit can encode the parameter using the context probability model selected by the control unit.

The parameter can include a flag that specifies whether a most probable mode (MPM) is used.

The control unit can control encoding of the flag that specifies whether an MPM is used, in accordance with the size and the shape of the region.

The parameter can include a flag that specifies a surrounding region to be referred in the most probable mode (MPM).

The control unit can control encoding of the flag that specifies a surrounding region to be referred in the MPM, in accordance with the shape and an ID of the region.

The parameter can include a flag that indicates a prediction direction of the intra prediction.

The control unit can control encoding the flag that indicates a prediction direction of the intra prediction, in accordance with the size and the shape of the region.

A transmission unit that transmits the parameter encoded by the encoding unit can be further included.

On aspect of the present disclosure is a method of processing an image in an image processing apparatus, in which a control unit controls encoding a parameter related to intra prediction in accordance with a region in a prediction processing unit, and an encoding unit encodes the parameter according to the control.

Another aspect of the present disclosure is an image processing apparatus, including: a reception unit configured to receive encoded data of a parameter related to intra prediction; a control unit configured to control decoding of the encoded data received by the reception unit, in accordance with a region in a prediction processing unit; and a decoding unit configured to decode the encoded data according to control by the control unit.

Still another aspect of the present disclosure is a method of processing an image in an image processing apparatus, in which a reception unit receives encoded data of a parameter related to intra prediction, a control unit controls decoding of the received encoded data, in accordance with a region in a prediction processing unit, and a decoding unit decodes the encoded data according to the control.

In one aspect of the present disclosure, encoding of a parameter related to intra prediction is controlled in accordance with a region in a prediction processing unit, and the parameter related to the intra prediction is encoded.

In another aspect of the present disclosure, encoded data of a parameter related to intra prediction is received, decoding of the received encoded data is controlled in accordance with a region in a prediction processing unit, and the encoded data is decoded according to the control.

Effects of the Invention

According to the present disclosure, an image can be processed. Especially, reduction in encoding efficiency can be suppressed.

BRIEF DESCRIPTION OF DRAWINGS

FIG. 10 is a diagram illustrating an example of a VLC table of mpm_lr_flag.

FIG. 11 is a diagram illustrating an example of a VLC table of intra_dir_mode.

FIG. 12 is a diagram illustrating an example of a table A.
FIG. 13 is a diagram illustrating an example of a table B.
FIG. 14 is a diagram illustrating an example of a table C.
FIG. 15 is a diagram illustrating an example of a table D.
FIG. 16 is a diagram illustrating an example of a table E.

FIG. 35 is a block diagram illustrating an example of a schematic configuration of an imaging device.

MODE FOR CARRYING OUT THE INVENTION

Modes for carrying out the present disclosure (hereinafter referred to as embodiments) will be described below. The description will be provided in the following order.
1. First embodiment (an image encoding device)
2. Second embodiment (an image decoding device)
3. Third embodiment (control of context probability model)
4. Fourth embodiment (computer)
5. Fifth embodiment (a television set)
6. Sixth embodiment (a mobile telephone)
7. Seventh embodiment (a recording/reproducing device)
8. Eighth embodiment (an imaging device)

1. First Embodiment

[Image Encoding Device]

Figure 1:
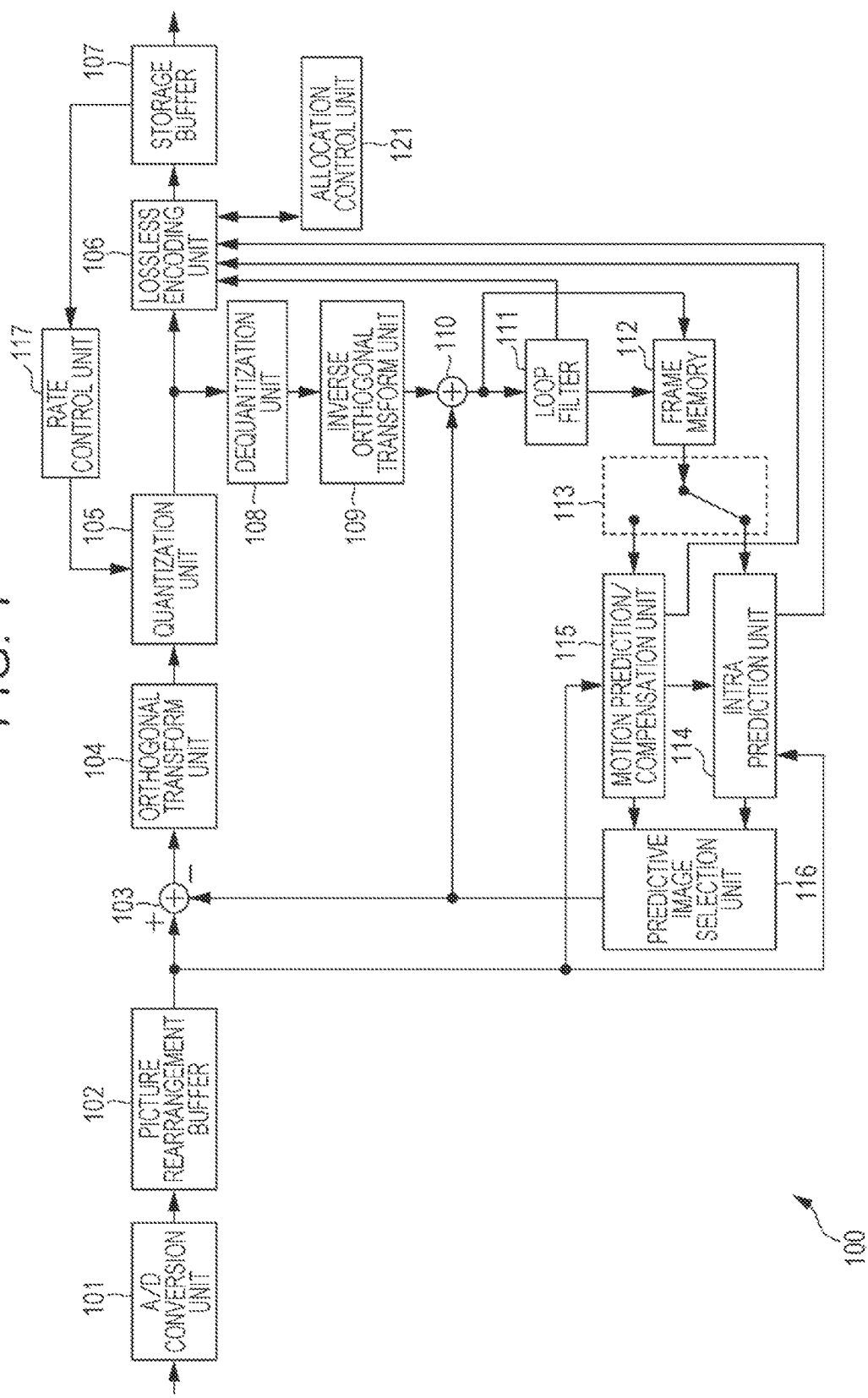
FIG. 1 is a block diagram illustrating an example of a main configuration of an image encoding device.

FIG. 1 is a block diagram illustrating an example of a main configuration of an image encoding device that is an image processing apparatus. An image encoding device 100 illustrated in FIG. 1 encodes image data while employing a prediction process as performed in an encoding system such as H.264 or MPEG (Moving Picture Experts Group) 4 Part 10 (AVC (Advanced Video Coding)).

As illustrated in FIG. 1, the image encoding device 100 includes an A/D conversion unit 101, a picture rearrangement buffer 102, a calculator 103, an orthogonal transform unit 104, a quantization unit 105, a lossless encoding unit 106, and a storage buffer 107. Further, the image encoding device 100 includes a dequantization unit 108, an inverse orthogonal transform unit 109, a calculator 110, a loop filter 111, a frame memory 112, a selection unit 113, an intra prediction unit 114, a motion prediction/compensation unit 115, a predictive image selection unit 116, and a rate control unit 117.

The image encoding device 100 further includes an allocation control unit 121.

The A/D conversion unit 101 performs A/D conversion on input image data and supplies the converted image data (digital data) to the picture rearrangement buffer 102 so as to store the converted image data therein. The picture rearrangement buffer 102 rearranges a frame arranged in the order of display in the stored image into the order adopted for encoding in accordance with GOP (Group Of Picture), and thereafter supplies the image with the rearranged frame order to the calculator 103. The picture rearrangement buffer 102 further supplies the image with the rearranged frame order to the intra prediction unit 114 and the motion prediction/compensation unit 115.

The calculator 103 subtracts a predictive image supplied by the intra prediction unit 114 or the motion prediction/compensation unit 115 via the predictive image selection unit 116 from the image read out of the picture rearrangement buffer 102, and outputs the differential information to the orthogonal transform unit 104.

For example, in a case of an image subjected to intra encoding, the calculator 103 subtracts the predictive image supplied from the intra prediction unit 114 from the images read out of the picture rearrangement buffer 102. When the image is subjected to inter encoding, for example, the calculator 103 subtracts the predictive image supplied by the motion prediction/compensation unit 115 from the image read out of the picture rearrangement buffer 102.

The orthogonal transform unit 104 performs an orthogonal transform such as a discrete cosine transform or a Karhunen-Loeve transform on the differential information supplied from the calculator 103. Note that the orthogonal transform method is selected arbitrarily. The orthogonal transform unit 104 then supplies the transform coefficient to the quantization unit 105.

The quantization unit 105 quantizes the transform coefficient supplied from the orthogonal transform unit 104. That is, the quantization unit 105 sets a quantization parameter on the basis of information regarding a target value of a code amount supplied from the rate control unit 117 and performs the quantization. Note that a method of this quantization is selected arbitrarily. The quantization unit 105 then supplies the quantized transform coefficient to the lossless encoding unit 106.

The lossless encoding unit 106 encodes the transform coefficient quantized in the quantization unit 105 by employing an arbitrary encoding system. Since the coefficient data is quantized under control of the rate control unit 117, the code amount corresponds with the target value set by the rate control unit 117 (or approaches to the target value).

The lossless encoding unit 106 also obtains intra prediction information including information indicating a mode for intra prediction and the like from the intra prediction unit 114, and obtains inter prediction information including information indicating a mode for inter prediction, motion vector information and the like from the motion prediction/compensation unit 115. The lossless encoding unit 106 further acquires a filter coefficient and the like used in the loop filter 111.

The lossless encoding unit 106 encodes these various pieces of information by an arbitrary encoding system and makes it a part of header information of the encoded data (i.e., multiplexing). The lossless encoding unit 106 then supplies the encoded data obtained by the encoding to the storage buffer 107 and stores the data therein.

The lossless encoding unit 106 can employ variable length encoding or arithmetic encoding, for example, as the encoding system. CAVLC (Context-Adaptive Variable Length Coding) specified in the H.264/AVC scheme, for example, can be employed as the variable length encoding. CABAC (Context-Adaptive Binary Arithmetic Coding) can be employed as the arithmetic encoding, for example.

The storage buffer 107 temporarily holds the encoded data supplied from the lossless encoding unit 106. At a predetermined timing, the storage buffer 107 outputs the encoded data being held therein to a recording device (a recording medium) or a transmission path that is not shown but disposed in a following stage. That is, encoded various types of information are supplied to the decoding side.

The transform coefficient quantized in the quantization unit 105 is also supplied to the dequantization unit 108. The dequantization unit 108 dequantizes the quantized transform coefficient by a method corresponding to the quantization performed by the quantization unit 105. The dequantization method may be any method as long as it corresponds to the quantization process performed by the quantization unit 105. The dequantization unit 108 supplies the transform coefficient obtained to the inverse orthogonal transform unit 109.

The inverse orthogonal transform unit 109 performs an inverse orthogonal transform on the transform coefficient supplied from the dequantization unit 108 by a method corresponding to an orthogonal transform process performed by the orthogonal transform unit 104. The inverse orthogonal transform method may be any method as long as it corresponds to the orthogonal transform process performed by the orthogonal transform unit 104. The inversely orthogonally transformed output (locally decoded differential information) is supplied to the calculator 110.

The calculator 110 adds a predictive image supplied from the intra prediction unit 114 or the motion prediction/compensation unit 115 through the predictive image selection unit 116 to the inverse orthogonal transform result supplied from the inverse orthogonal transform unit 109, in other words, the locally decoded differential information to obtain a locally reconfigured image (hereinafter, referred to as a reconfigured image). The reconfigured image is supplied to the loop filter 111 or the frame memory 112.

The loop filter 111 including a deblocking filter and an adaptive loop filter performs the filter process on the decoded image supplied from the calculator 110 as deemed appropriate. The loop filter 111 removes block distortion in the decoded image, for example, by performing a deblocking filter process on the decoded image. The loop filter 111 also improves image quality by performing a loop filter process on the outcome of the deblocking filter process (the decoded image from which the block distortion has been removed) by using a Wiener filter, for example.

Note that the loop filter 111 may be adapted to perform an arbitrary filter process on the decoded image. The loop filter 111 can also supply information such as a filter coefficient used in the filter process to the lossless encoding unit 106 as needed in order to encode the information.

The loop filter 111 supplies the filter process result (hereinafter, referred to as a decoded image) to the frame memory 112.

The frame memory 112 stores the reconfigured image supplied from the calculator 110 and the decoded image supplied from the loop filter 111, respectively. The frame memory 112 supplies the reconfigured image stored therein to the intra prediction unit 114 through the selection unit 113 at a predetermined timing or based on a request from an outside such as the intra prediction unit 114. The frame memory 112 also supplies the decoded image stored therein to the motion prediction/compensation unit 115 through the selection unit 113 at a predetermined timing or based on a request from an outside such as the motion prediction/compensation unit 115.

The selection unit 113 indicates a supply destination of the image output from the frame memory 112. For example, in a case of intra prediction, the selection unit 113 reads an image not subjected to a filter process (reconfigured image) out of the frame memory 112, and supplies it as a surrounding image to the intra prediction unit 114.

In addition, for example, in a case of inter prediction, the selection unit 113 reads an image subjected to the filter process (decoded image) out of the frame memory 112, and supplies it as a reference image to the motion prediction/compensation unit 115.

When the intra prediction unit 114 acquires an image (surrounding image) of a surrounding PU positioned around the PU of interest to be processed from the frame memory 112, the intra prediction unit 114 performs intra prediction (in-screen prediction) to generate a predictive image of the PU of interest using pixel value of the surrounding image. The intra prediction unit 114 performs this intra prediction in a plurality of modes (intra prediction modes) prepared in advance.

The intra prediction unit 114 generates a predictive image in all candidate intra prediction modes, evaluates a cost function value for each predictive image by using the input image supplied from the picture rearrangement buffer 102, and selects an optimal mode. Upon selecting the optimal intra prediction mode, the intra prediction unit 114 supplies the predictive image generated in the optimal mode to the predictive image selection unit 116.

In addition, the intra prediction unit 114 appropriately supplies the intra prediction information including information related to intra prediction such as the optimal intra prediction mode to the lossless encoding unit 106, and allows the lossless encoding unit 106 to encode the information.

The motion prediction/compensation unit 115 performs motion prediction (inter prediction) with the PU as a basic processing unit by using the input image supplied from the picture rearrangement buffer 102 and the reference image supplied from the frame memory 112 through the selection unit 113, performs a motion compensation process in accordance with a motion vector detected, and generates a predictive image (inter predictive image information). The motion prediction/compensation unit 115 performs this inter prediction in a plurality of modes (inter prediction modes) prepared in advance.

The motion prediction/compensation unit 115 generates a predictive image in all candidate inter prediction modes, evaluates a cost function value for each predictive image, and selects an optimal mode. Upon selecting the optimal inter prediction mode, the motion prediction/compensation unit 115 supplies the predictive image generated in the optimal mode to the predictive image selection unit 116.

In addition, the motion prediction/compensation unit 115 supplies the inter prediction information including information related to inter prediction such as the optimal inter prediction mode to the lossless encoding unit 106, and allows the lossless encoding unit 106 to encode the information. Further, when the inter prediction is selected as the optimal prediction mode, the motion prediction/compensation unit 115 notifies the intra prediction unit 114 of information of the optimal inter prediction mode.

The predictive image selection unit 116 selects an origin from which the predictive image is supplied to the calculator 103 and the calculator 110. For example, in a case of intra encoding, the predictive image selection unit 116 selects the intra prediction unit 114 as the supply source of a predictive image, and supplies the predictive image supplied from the intra prediction unit 114 to the calculator 103 and the calculator 110. When performing the inter encoding, for example, the predictive image selection unit 116 selects the motion prediction/compensation unit 115 as the origin from which the predictive image is supplied, and supplies the predictive image supplied from the motion prediction/compensation unit 115 to the calculator 103 and the calculator 110.

The rate control unit 117 controls the rate of quantizing operation performed by the quantization unit 105 on the basis of the code amount of the encoded data accumulated in the storage buffer 107 so as not to cause overflow or underfloor.

In performing arithmetic encoding of information related to intra prediction such as mpm_flag, mpm_lr_flag, and intra_dir_mode, the allocation control unit 121 controls a code number to be allocated to the values. To be specific, for example, the allocation control unit 121 selects a VLC table (variable length encoding table) for converting the values of mpm_flag, mpm_lr_flag, and intra_dir_mode into code numbers. At that time, the allocation control unit 121 selects the VLC table according to the size or the shape of the PU of interest to be predicted.

[Coding Unit]

Here, a HEVC encoding system will be described. First, a coding unit defined in the HEVC encoding system will be described.

Also referred to as a coding tree block (CTB), the coding unit (CU) is a partial region of an image in a picture unit and plays the similar role to that of the macroblock in the AVC. The latter has the fixed size of 16×16 pixels, whereas the size of the former is unfixed and thus specified in the image compression information in each sequence.

In particular, a CU having a maximum size is called largest coding unit (LCU), and a CU having a minimum size is referred to as smallest coding unit (SCU). For example, the sizes of these regions are specified in a sequence parameter set included in the image compression information, where the sizes are limited to squares and are expressed in a power of 2, respectively.

Figure 2:
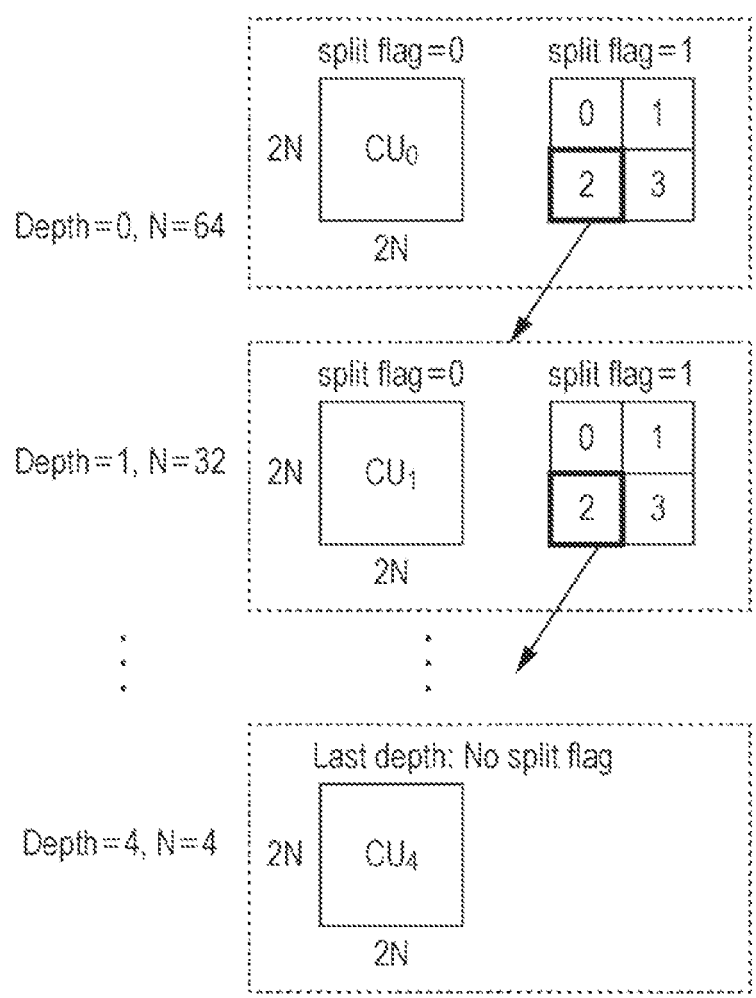
FIG. 2 is a diagram illustrating an example of a configuration of a coding unit.

FIG. 2 illustrates an example of a coding unit defined in HEVC. In an example illustrated in FIG. 2, the LCU is 128×128 pixels in size while the maximum hierarchical depth is 5. The CU with 2N×2N pixels in size is divided into the CU with N×N pixels in size that is one level lower in the hierarchy when the value of split_flag is "1".

The CU is further divided into a prediction unit (PU) that is a region (a partial region of an image in a picture unit) to be a processing unit for the intra prediction or the inter prediction and then into a transform unit (TU) that is a region (a partial region of an image in a picture unit) to be a processing unit for the orthogonal transform.

Note that, hereinafter, description will be given using the processing unit (CU, PU, and the like). However, obviously, the processing unit is also applicable to similar regions such as a macroblock or a sub-macroblock of AVC, for example.

[HEVC Intra Prediction System]

Next, an intra prediction system defined in HEVC will be described.

In HEVC, the unit of a PU for intra prediction is 4×4, 8×8, 16×16, 32×32, or 64×64.

For the size of 4×4, an intra prediction process similar to AVC is performed.

For the size of 8×8, an intra prediction process is performed based on a system called Angular Prediction described below.

For the sizes of 16×16, 32×32, and 64×64, an intra prediction process is performed based on a system called Arbitrary Directional Intra (ADI) described below.

Further, to improve the encoding efficiency prior to the intra prediction, a low pass filter process with a coefficient (1, 2, 1) is applied to the surrounding image value. Information related to apply/not apply is transmitted to the image compression information for each PU.

Hereinafter, an Angular Prediction intra prediction system defined in the HEVC encoding system will be described.

[Angular Prediction Intra Prediction System]

Figure 3:
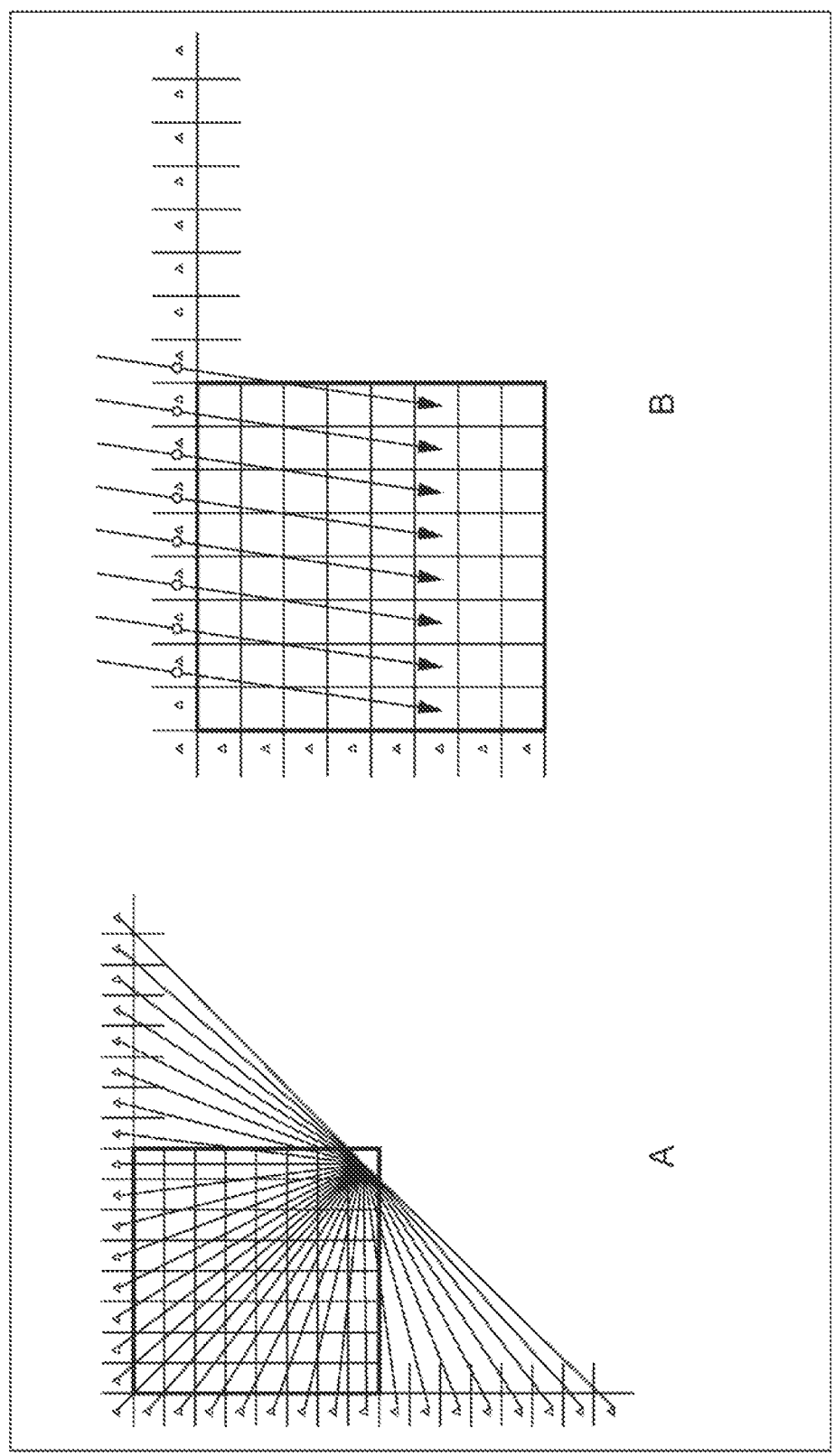
FIG. 3 is a diagram illustrating an example of an Angular Prediction intra prediction system.

FIG. 3 is a diagram illustrating the Angular Prediction intra prediction system.

That is, in Angular Prediction, an intra prediction process of angles illustrated in A of FIG. 3.

In addition, to perform the intra prediction of the angles illustrated in A of FIG. 3, it is necessary to use the pixel values among the surrounding images as illustrated in B of FIG. 3. Therefore, in Angular Prediction, a linear interpolation process of ⅛ pixel accuracy can be performed.

[Arbitrary Directional Intra (ADI) Prediction System]

Next, an Arbitrary Directional Intra (ADI) prediction system defined in the HEVC encoding system will be described.

Figure 4:
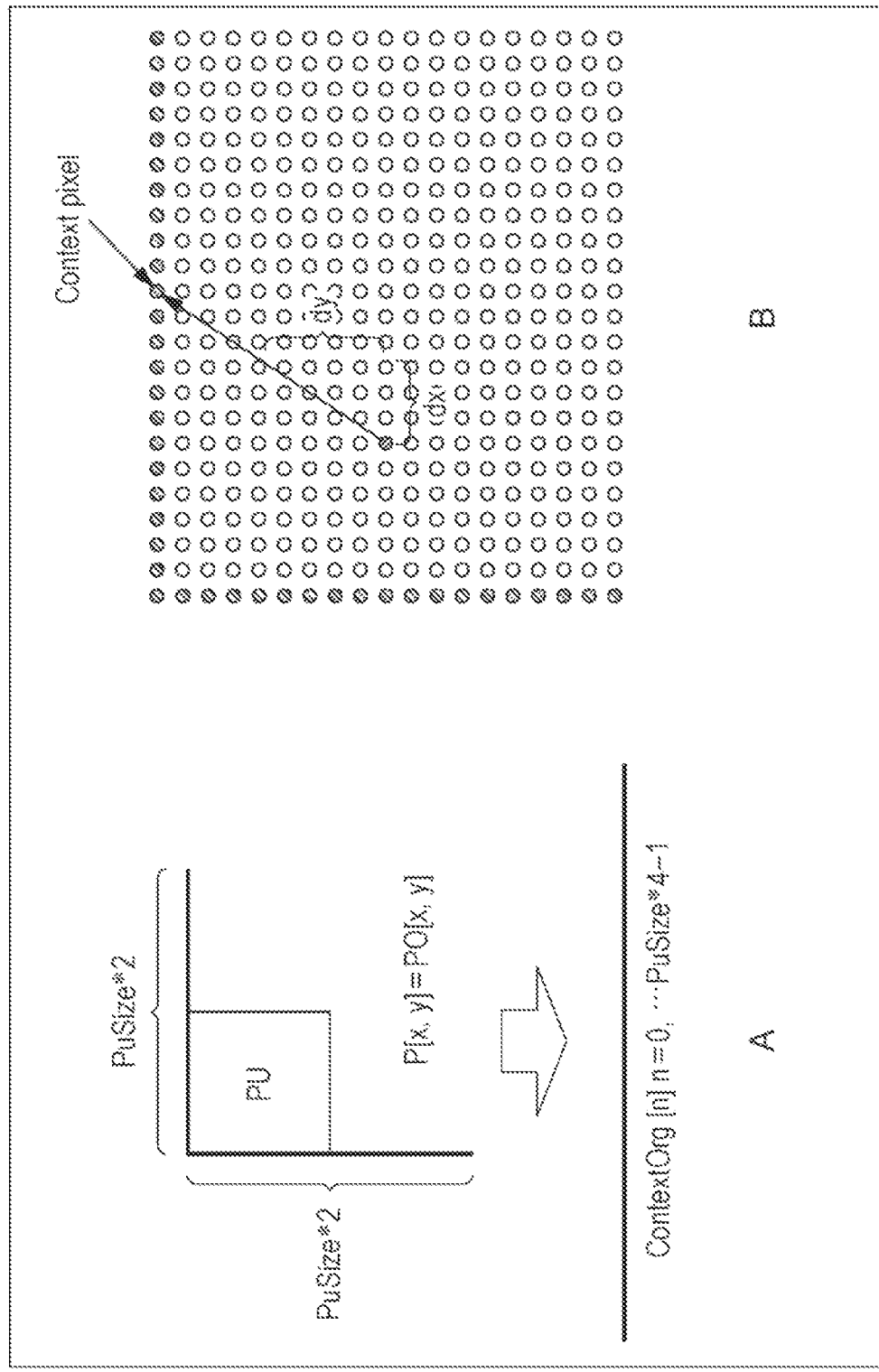
FIG. 4 is a diagram illustrating an example of an Arbitrary Directional Intra prediction system.

FIG. 4 illustrates a diagram for illustrating an Arbitrary Directional Intra (ADI) prediction system.

In the Arbitrary Directional Intra (ADI) prediction system, an adjacent pixel value positioned on the lower left, as illustrated in A of FIG. 4, is used.

Similarly to the case of the AVC encoding system, each prediction mode of Vertical, Horizontal, DC, Diagonal Down-Left, Diagonal Down-Right, Vertical-Right, Horizontal-Down, Vertical-Left, and Horizontal-Up is defined. As for other modes, (dx, dy) is transmitted to the image compression information as the encoding information, as illustrated in B of FIG. 4.

[Correlation Between Prediction Unit and Intra Prediction]

Figure 5:
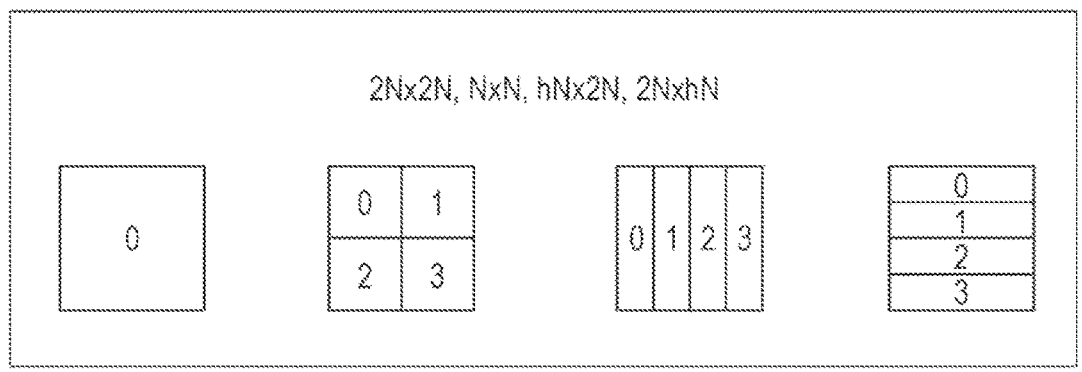
FIG. 5 is a diagram illustrating an example of a partition type of a PU.

In HEVC, 2N×2N, N×N, hN×2N, and 2N×hN are prepared as partition types of the prediction unit (PU) of the intra prediction mode, as illustrated in FIG. 5. In FIG. 5, each square represents a PU, and the figures indicate partition IDs (Partition ids). Here, N means ½ of the size of the coding unit (CU). Further, hN means ½ of N (hN=N/2). For example, in the case where the CU is 16×16, 2N×2N, N×N, hN×2N, and 2N×hN are 16×16, 8×8, 4×16, and 16×8, respectively.

As illustrated in FIG. 5, in the case of 2N×2N, one PU is formed for one CU. Further, in the case of N×N, two in lengthwise and two in crosswise (four in total) of PUs are formed for one CU. Further, in the case of hN×2N, one in lengthwise and four in crosswise (four in total) of Pus are formed for one CU. Further, in the case of 2N×hN, four in lengthwise and one in crosswise (four in total) of PUs are formed for one CU. That is, the size of the PU depends on the size of the CU.

The image encoding device 100 performs prediction processing and encoding with each partition type, calculates a cost function value, and determines which partition type is employed based on the cost function value. That is, the partition type is selected based on the encoding efficiency and evaluation of image quality. In addition, the CU size (that is, the size of the PU) is similarly determined.

The image encoding device 100 includes a flag intra_dir_mode that indicates an intra prediction direction in a bit stream, and transmits the bit stream. In addition, the image encoding device 100 includes information related to the PU such as the CU size, the partition type, and the partition ID in the stream, and transmits the stream. Note that the CU size is determined according to information of the size and the position of a LCU, split_flag, and the like.

As described above, the size and the shape (a square, a rectangle, and the like) of the PU depend on the content of the image to be encoded. By the way, an optimal prediction direction of the intra prediction is also selected from a plurality of directions based on the cost function value. That is, the prediction direction of the intra prediction also depends on the content of the image. That is, the prediction direction of the intra prediction has no negligible correlation with the size and the shape of the PU.

Description will be given in more details. For example, assume an image such as a horizontal stripe, which has a high correlation in the horizontal direction and a low correlation in the vertical direction is an image to be processed.

As described above, the size and the shape of the PU is determined according to the cost function value. This cost function value is substantially affected by a result of orthogonal transform processing. Typically, in orthogonal transform, if the processing unit is enlarged for a continuous (high correlation) image, the degree of concentration of energy can be easily increased and the performance can be easily improved (high efficiency can be easily obtained in quantization and encoding and the cost function value is more likely to be decreased). In contrast, if the processing unit is increased for a discontinuous (low correlation) image, the degree of concentration of energy is not increased. That is, if the processing unit is narrowed and the processing is performed for the discontinuous (low correlation) image, the performance can be easily improved (the cost function value is more likely to be decreased).

That is, a favorable result can be easily obtained for the texture like the above-described horizontal stripe if the orthogonal transform is performed where the processing unit is long in the horizontal direction and is short in the vertical direction. Therefore, in the case of a horizontal stripe image, a PU having the horizontal direction as a longitudinal direction is more likely to be selected. That is, the partition type of 2N×hN is more likely to be selected.

In contrast, in intra prediction, the prediction accuracy is, as is obvious, improved by performing prediction in the direction having a high correlation. That is, in the case of a horizontal stripe image, the horizontal direction having a high correlation is more likely to be selected as the prediction direction.

By a similar reason, in a case where a vertical stripe image is an image to be processed, a PU (the partition type of hN×2N) where the vertical direction is the longitudinal direction is more likely to be selected, and the vertical direction is more likely to be selected as the prediction direction.

As described above, there is a high possibility that the longitudinal direction of a PU is more likely to be selected as the prediction direction of the intra prediction. That is, there is a high possibility that deviation is caused in the generation frequency of the intra prediction direction depending on the size and the form of the PU.

Actual images are diverse, and the prediction direction of the intra prediction and the longitudinal direction of the PU do not necessarily correspond to each other. However, as described above, these directions have no negligible correlation with the content of the image to be processed. Therefore, a direction closer to the longitudinal direction of the PU tends to be selected as the prediction direction of the intra prediction. That is, deviation depending on the size and the shape of the PU is caused in the generation frequency (generation probability) of each value of intra_dir_mode.

Figure 6:
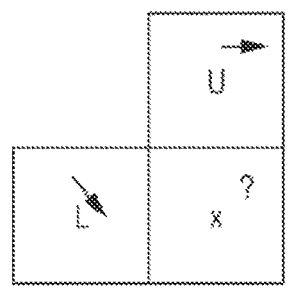
FIG. 6 is a diagram illustrating Most Probable Mode.

Further, in HEVC, an encoding system called most probable mode (MPM) is prepared. In this MPM, as illustrated in FIG. 6, the same prediction direction as a PU (L) on the left of a PU of interest (x) to be processed or a PU (U) above the PU of interest (x) to be processed is applied to the PU of interest (x). That is, in the case of the MPM, transmission of the intra prediction mode of the PU of interest (x) is omitted for improvement of the encoding efficiency.

Instead, a flag_mpm_flag that specifies whether the MPM is used for the PU of interest (x), and a flag mpm_lr_flag that indicates which intra prediction direction of a surrounding PU (L) and of a surrounding PU (U) is used for the PU of interest(x) are transmitted. That is, in the case of the MPM, the image encoding device 100 includes and transmits mpm_flag and mpm_lr_flag in a bit stream, and in the case of not the MPM, the image encoding device 100 includes and transmits mpm_flag and intra_dir_mode in the bit stream.

Typically, the distance between the PUs (for example, between the centers thereof) becomes larger as the PU is larger, and thus, the correlation between the images is more likely to be reduced. Therefore, typically, the MPM is less likely to be employed as the PU becomes larger. That is, a value of mpm_flag has no negligible correlation with the size of the PU. In other words, deviation depending on the size and the shape of the PU is more likely to be caused in the generation frequency (generation probability) of each value of mpm_flag.

Further, in the MPM, which prediction direction of the left PU (L) and of the above PU (U) is employed as the prediction direction of the PU of interest (x) is determined with a cost function value. That is, a value of mpm_lr_flag has no negligible correlation with the shape of the PU. In other words, deviation depending on the size and the shape of the PU is more likely to be caused in the generation frequency (generation probability) of each value of mpm_lr_flag.

An image decoding device corresponding to the image encoding device 100 decodes the encoded data based on the information such as mpm_flag, mpm_lr_flag, intra_dir_mode, the CU size, the partition type, and the partition ID (partition id) included in the bit stream.

These pieces of information are converted into code numbers (binarized) in the lossless encoding unit 106, and are then subjected to arithmetic encoding such as CABAC and are included in the bit stream. Therefore, the encoding efficiency is decreased by these pieces of information. However, in a conventional method, allocation of the code numbers to these pieces of information is performed by predetermined one method (with initial values as they are) without considering an increase in code amount.

For example, when a large number of small PUs is generated, the information amount generated for each PU is increased. Further, for example, in a case where the quantization parameter is large, that is, in a case of a low bit rate, the proportion of these pieces of information to the bit stream becomes larger. Therefore, especially in such a case, there is a possibility that reduction in encoding efficiency due to the information such as the mpm_flag, mpm_lr_flag, intra_dir_mode, the CU size, the partition type, and the partition ID (partition id) becomes more prominent.

As described above, in the conventional method, it may be difficult to obtain sufficient encoding efficiency.

Therefore, the present technology focuses on the high correlation between the size and the shape of the PU and the value of each parameter of the intra prediction. That is, an objective of the present technology is to suppress reduction in encoding efficiency, and uses the fact that the deviation depending on the size and the shape of the PU is more likely to be caused in the value of each parameter of the intra prediction, as described above.

To be specific, the image encoding device 100 allocates a code number to the value of each parameter according to the size and the shape of the PU so as to improve the encoding efficiency. That is, the image encoding device 100 selects a VLC table to which the code numbers are allocated according to the size and the shape of the PU.

[Lossless Encoding Unit and Allocation Control Unit]

Figure 7:
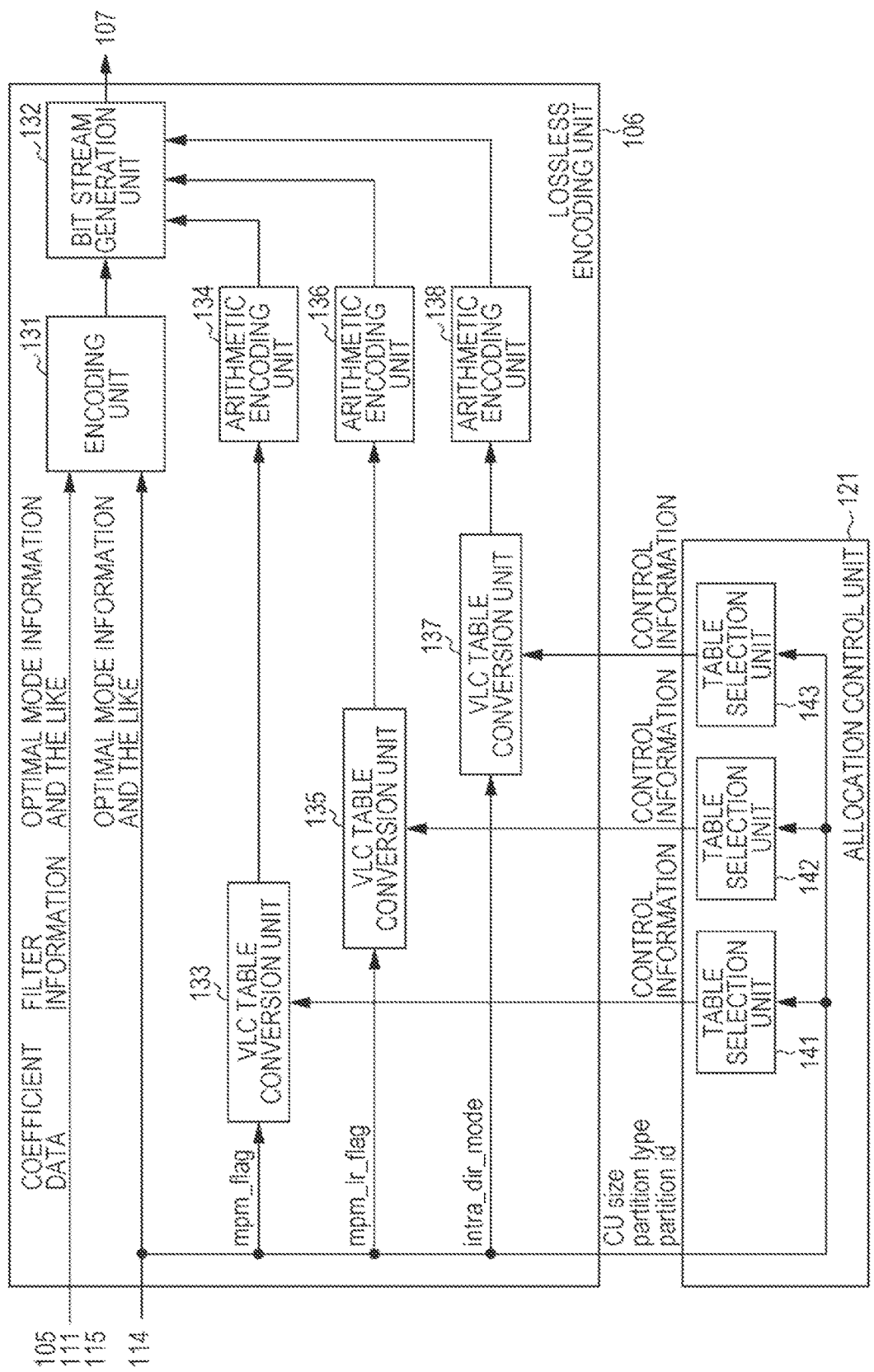
FIG. 7 is a block diagram illustrating an example of a main configuration of a lossless encoding unit and an allocation control unit.

FIG. 7 is a block diagram illustrating an example of a main configuration of the lossless encoding unit 106 and the allocation control unit 121 of FIG. 1.

As illustrated in FIG. 7, the lossless encoding unit 106 includes an encoding unit 131, a bit stream generation unit 132, a VLC table conversion unit 133, an arithmetic encoding unit 134, a VLC table conversion unit 135, an arithmetic encoding unit 136, a VLC table conversion unit 137, and an arithmetic encoding unit 138.

Further, the allocation control unit 121 includes table selection units 141 to 143.

The encoding unit 131 encodes various types of information such as quantized coefficient data supplied from the quantization unit 105, a filter coefficient supplied from the loop filter 111, optimal mode information supplied from the motion prediction/compensation unit 115, and optimal mode information supplied from the intra prediction unit 114, and supplies the encoded data to the bit stream generation unit 132.

The VLC table conversion unit 133 acquires mpm_flag from the intra prediction unit 114, and converts the value into a code number using the VLC table selected by the table selection unit 141. The VLC table conversion unit 133 supplies the code number to the arithmetic encoding unit 134.

The arithmetic encoding unit 134 applies arithmetic encoding to the code number supplied from the VLC table conversion unit 133, and supplies the encoded data to the bit stream generation unit 132.

The VLC table conversion unit 135 acquires mpm_lr_flag from the intra prediction unit 114, and converts the value into a code number using the VLC table selected by the table selection unit 142. The VLC table conversion unit 135 supplies the code number to the arithmetic encoding unit 136.

The arithmetic encoding unit 136 applies arithmetic encoding to the code number supplied form the VLC table conversion unit 135, and supplies the encoded data to the bit stream generation unit 132.

The VLC table conversion unit 137 acquires intra_dir_mode from the intra prediction unit 114, and converts the value into a code number using the VLC table selected by the table selection unit 143. The VLC table conversion unit 137 supplies the code number to the arithmetic encoding unit 138.

The arithmetic encoding unit 138 applies arithmetic encoding to the code number supplied from the VLC table conversion unit 137, and supplies the encoded data to the bit stream generation unit 132.

The bit stream generation unit 132 generates a bit stream using the encoded data supplied from the encoding unit 131, the arithmetic encoding unit 134, the arithmetic encoding unit 136, and the arithmetic encoding unit 138, and supplies the bit stream to the storage buffer 107.

The table selection unit 141 selects the VLC table to be used in the VLC table conversion unit 133 based on the CU size and the partition type supplied from the intra prediction unit 114. That is, the table selection unit 141 stores a plurality of candidates of the VLC tables to be used in the VLC table conversion unit 133, selects one from the plurality of candidates based on the information supplied form the intra prediction unit 114, and supplies it to the VLC table conversion unit 133. The VLC table conversion unit 133 converts mpm_flag into a code number using the VLC table supplied from the table selection unit 141. The table selection unit 141 selects the VLC table for each PU.

Note that information indicating the VLC table selected by the table selection unit 141 may be supplied to the VLC table conversion unit 133 rather than supplying the selected VLC table as it is to the VLC table conversion unit 133. In that case, the VLC table conversion unit 133 stores a plurality of VLC tables to be a candidate (the same VLC tables stored in the table selection unit 141) in advance, selects one from the plurality of VLC tables according to the information supplied from the table selection unit 141, and use it in the conversion processing.

The table selection unit 142 selects the VLC table to be used in the VLC table conversion unit 135 based on the partition type and the partition ID (partition id) supplied from the intra prediction unit 114. That is, the table selection unit 142 stores a plurality of candidates of the VLC tables to be used in the VLC table conversion unit 135, selects one from the plurality of candidates based on the information supplied from the intra prediction unit 114, and supplies it to the VLC table conversion unit 135. The VLC table conversion unit 135 converts mpm_lr_flag table into a code number using the VLC table supplied from the selection unit 142. The table selection unit 142 selects the VLC table for each PU.

Note that information indicating the VLC table selected by the table selection unit 142 may be supplied to the VLC table conversion unit 135 rather than supplying the selected VLC table as it is to the VLC table conversion unit 135. In that case, the VLC table conversion unit 135 stores a plurality of VLC tables to be a candidate (the same VLC tables stored in the table selection unit 141) in advance, selects one from the plurality of VLC tables according to the information supplied from the table selection unit 142, and uses it in the conversion processing.

The table selection unit 143 selects the VLC table to be used in the VLC table conversion unit 137 based on the CU size and the partition type supplied form the intra prediction unit 114. That is, the table selection unit 143 stores a plurality of candidates of the VLC tables to be used in the VLC table conversion unit 137, selects one from the plurality of candidates based on the information supplied from the intra prediction unit 114, and supplies it to the VLC table conversion unit 137. The VLC table conversion unit 137 converts intra_dir_mode in to a code number using the VLC table supplied from the table selection unit 143. The table selection unit 143 selects the VLC table for each PU.

Note that information indicating the VLC table selected by the table selection unit 143 may be supplied to the VLC table conversion unit 137 rather than supplying the selected VLC table as it is to the VLC table conversion unit 137. In that case, the VLC table conversion unit 137 stores a plurality of VLC tables to be a candidate (the same VLC tables stored by the table selection unit 143) in advance, selects one from the plurality of VLC tables according to the information supplied form the table selection unit 143, and uses it in the conversion processing.

Typically, the code amount becomes smaller as the code number is smaller. Therefore, the table selection units 141 to 143 allocate smaller code numbers to the values having higher possibilities of generation so that the possibility of decrease in code amount becomes higher (the code amount becomes smaller).

[Intra Prediction Direction]

A similar intra prediction mode to HEVC is prepared for the image encoding device 100. That is, as illustrated in FIG. 8, 33 prediction directions and the DC mode are prepared for the intra prediction of the image encoding device 100.

Figures 8, 9:
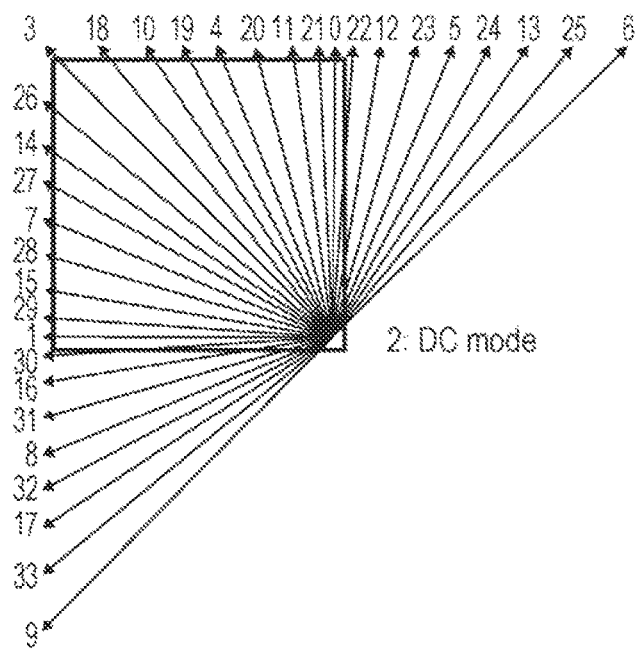
FIG. 8 is a diagram illustrating an example of a prediction direction.
FIG. 9 is a diagram illustrating an example of a VLC table of mpm_flag.

Each arrow in the example illustrated in FIG. 8 indicates the prediction direction of a lower right pixel of the PU of interest of the square, which is a PU to be predicted (which adjacent pixel of direction is to be referred). Further, identification information (number) is allocated to each prediction direction and DC mode, as illustrated in FIG. 8. For example, when the intra prediction direction is 0, the lower right pixel refers to a closest adjacent pixel in the vertical direction, that is, a pixel next above.

The intra prediction unit 114 selects, with respect to the PU of interest, a direction where the encoding efficiency is maximized from the intra prediction directions illustrated in FIG. 8. In this selection, a cost function of $D+\lambda R$ is often used. Here, D is a difference between an input image and an intra predictive image and is a distortion amount, R is a code amount necessary for intra prediction encoding, and $\lambda$ is a transform coefficient connecting the distortion amount and the code amount. The intra prediction direction is determined so that the cost function becomes smaller. For example, the intra prediction unit 114 calculates a cost function value by a similar method to HEVC described in Non-Patent Document 1, and determines the intra prediction direction.

[VLC Table of mpm_flag]

Next, a VLC table controlled by the allocation control unit 121 will be described. First, control of a VLC table of mpm_flag will be described.

The table selection unit 141 selects a VLC table like the table illustrated in FIG. 9 according to the CU size and the partition type. In the table illustrated in FIG. 9, each row of the left two columns represents a VLC table. That is, the table selection unit 141 selects a table for converting each state of mpm_flag=0 and mpm_flag=1 into a code number. In this case, the code number is 0 or 1 (that is, one bit). The code amount of the code number 0 is smaller than that of the code number 1.

Typically, the surrounding PU becomes distant from the PU of interest as the CU size becomes larger. For example, the distance between the mutual centers becomes larger. Typically, the correlation is decreased as the distance becomes larger. Therefore, the possibility that the MPM is applied is decreased (the frequency is reduced). Note that even if the CU size is large, the distance between the PU of interest and the surrounding PU in the direction of hN is small.

Therefore, the table selection unit 141 uses this characteristic, and selects the VLC table after applying VLC table conversion to mpm_flag so that the number of symbol 0 becomes large. That is, the table selection unit 141 selects the VLC table so that the number of symbol 0 becomes large after the conversion, according to the CU size and the partition type.

For example, when the CU size is large and the PU of interest is a square, the distance between the PU of interest and a surrounding PU in any direction becomes larger. That is, the MPM is less likely to be selected. Therefore, mpm_flag=0 is easily generated. In this case, the table selection unit 141 converts mpm_flag=0 having a high possibility into the code number 0 having a small code amount.

In contrast, when the CU size is small or the PU of interest is a rectangle, there is a surrounding PU in a short distance, and thus, the MPM is more likely to be selected. Therefore, in this case, the table selection unit 141 converts mpm_flag=1 having a higher possibility of emergence into the code number 0 having a small code amount.

In the example of FIG. 9, when the CU size is 32 or more, and the partition type is N×N or 2N×2N, the table selection unit 141 selects a table that converts mpm_flag=0 into the code number 0 and converts mpm_flag=1 into the code number 1.

Further, when the CU size is 32 or more and the partition type is 2N×hN or hN×2N, the table selection unit 141 selects a table that converts mpm_flag=0 into the code number 1 and converts the mpm_flag=1 into the code number 0.

Further, when the CU size is smaller than 32, the table selection unit 141 selects a table that converts mpm_flag=0 into the code number 1 and converts mpm_flag=1 into the code number 0 regardless of the partition type (the shape of the PU).

As described above, the VLC table for mpm_flag is selected, the table selection unit 141 can suppress the increase in encoding efficiency due to mpm_flag.

[VLC Table of mpm_lr_flag]

Next, control of a VLC table of mpm_lr_flag will be described.

The table selection unit 142 selects a VLC table like the table illustrated in FIG. 10 according to the partition ID and the partition type. In the table illustrated in FIG. 10, each row of the left two columns is a VLC table. That is, the table selection unit 142 selects a table for converting each state of mpm_lr_flag=0 and mpm_lr_flag=1 in to a code number. In this case, the code number is 0 or 1 (that is, 1 bit). The code amount of the code number 0 is smaller than that of the code number 1. Note that the section of "–" will be described below.

First, a PU having the partition ID of 0 will be described. As described above, the correlation between the PU of interest and a surrounding PU becomes higher as the distance therebetween becomes smaller. Therefore, in a case where the PU is a rectangle, a surrounding PU in a short direction (a direction not the longitudinal direction) is more likely to be selected than a surrounding PU in the longitudinal direction. In contrast, when the PU of interest is a square, the distances from the PU of interest to the above adjacent PU and to the left adjacent PU are equal. Therefore, both surrounding PUs have approximately the same possibility of being selected.

Therefore, the table selection unit 142 uses this characteristic, and selects a VLC table after applying VLC table conversion to mpm_lr_flag so that the number of symbol 0 becomes large. That is, the table selection unit 142 selects a VLC table so that the number of symbol 0 becomes large after conversion, according to the partition ID and the partition type.

In the example of FIG. 10, when the partition ID is 0 and the PU is a square (the partition type is 2N×2N or N×N), the table selection unit 142 gives priority to the above adjacent PU, and converts mpm_lr_flag=0 into a code number 0 having a smaller code amount.

Further, in the example of FIG. 10, when the partition ID is 0 and the PU is a horizontally long rectangle (the partition type is 2N×hN), the table selection unit 142 gives priority to the above adjacent PU, and converts mpm_lr_flag=0 into the code number 0 having a smaller code amount.

Further, in the example of FIG. 10, when the partition ID is 0 and the PU is a vertically long rectangle (the partition type is hN×2N), the table selection unit 142 gives priority to the left adjacent PU, and converts mpm_lr_flag=1 into the code number 0 having a smaller code amount.

Further, in the example of FIG. 10, when the partition ID is something other than 0 and the PU is a square (the partition type is N×N), the table selection unit 142 gives priority to the above adjacent PU, and converts mpm_lr_flag=0 into the code number 0 having a smaller code amount. Note that, when the partition type is 2N×2N, there is no case where the partition ID is something other than 0. That is, in this case, the VLC table is not selected (–).

Further, in the example of FIG. 10, when the partition ID is something other than 0 and the PU is a rectangle, the same code number as the PU having the partition ID of 0 is selected. That is, in this case, the VLC table is not selected (–).

As described above, the VLC table for mpm_lr_flag is selected, the table selection unit 142 can suppress an increase in encoding efficiency due to mpm_lr_flag.

[VLC Table of intra_dir_mode]

Next, control of a VLC table of intra_dir_mode will be described.

The table selection unit 143 selects a VLC table like the table illustrated in FIG. 11 according to the partition ID and the partition type. In the table illustrated in FIG. 11, each row of the left two columns is a VLC table. That is, the table selection unit 143 selects tables A to E according to the partition type and the CU size.

In the case of intra_dir_mode, similarly to other cases, allocation of the code number is controlled so that the code amount after conversion becomes smaller. That is, a smaller code number is allocated to a pattern having a higher possibility of emergence.

When the PU of interest is a square, the sizes of the PU of interest in the horizontal direction and in the vertical direction are the same. Therefore, there is a high possibility that deviation of the emergence frequency of the prediction direction due to the size and the shape of the PU of interest is not caused. Therefore, the table selection unit 143 selects the table A regardless of the CU size when the partition type is 2N×2N or N×N, as illustrated in FIG. 11.

An example of the table A is illustrated in FIG. 12. In the example of FIG. 12, allocation of a code number to each prediction direction is performed so that deviation in the horizontal direction and in the vertical direction becomes small. Note that the MPM is the intra prediction direction selected in the above MPM, and indicates an example of VER-4. If the MPM is DC, the code number of DC is replaced with MPM, and from the code number next below, the code numbers are replaced so as to be carried down. That is, allocation of a code number to the prediction direction of the MPM is omitted. Therefore, smaller code numbers can be allocated to other prediction directions. Therefore, the encoding efficiency can be improved. The same applies to the other tables described below.

In the example of FIG. 12, the code length of the code numbers allocated to most of the prediction directions is 5. That is, in the table A, there is no big difference in code length even if which prediction direction emerges.

In contrast, as illustrated in FIG. 11, when the PU is a horizontally long rectangle, that is, when the partition type is 2N×hN, the table selection unit 143 selects the table B if the CU size is small (when 32 or less).

An example of the table B is illustrated in FIG. 13. As illustrated in FIG. 13, in this table B, code numbers having smaller values (having shorter code lengths) are allocated to the prediction directions closer to the horizontal direction that is the longitudinal direction of the PU of interest. That is, code numbers having smaller code amounts are allocated to the prediction directions closer to the horizontal direction having higher possibilities of emergence in consideration of deviation of emergence frequency due to the size and the shape of the PU. In the case of the table B, the code numbers having the code lengths 4 to 7 are allocated.

In contrast, as illustrated in FIG. 11, when the PU is a vertically long rectangle, that is, when the partition type is hN×2N, the table selection unit 143 selects the table C when the CU size is small (when 32 or less).

An example of the table C is illustrated in FIG. 14. As illustrated in FIG. 14, in this table C, code numbers having smaller values (having shorter code lengths) are allocated to the prediction directions closer to the vertical direction that is the longitudinal direction of the PU of interest. That is, code numbers having smaller code amounts are allocated to the prediction directions closer to the vertical direction having higher possibilities of emergence in consideration of the deviation of emergence frequency due to the size and the shape of the PU. In the case of the table C, similarly to the case of the table B, the code numbers having the code lengths 4 to 7 are allocated.

Note that, typically, the deviation of the possibility of emergence of each prediction direction becomes larger as the CU size is larger. Therefore, as illustrated in FIG. 11, when the CU size is large, the table selection unit 143 selects a table different from the case where the CU size is small. For example, when the PU is a horizontally long rectangle (when the partition type is 2N×hN) and the CU size is large (when larger than 32), the table selection unit 143 selects the table D instead of the table B.

An example of the table D is illustrated in FIG. 15. As illustrated in FIG. 15, in this table D, the order of allocation of the code numbers to the prediction directions (the order of allocation of the smaller code numbers to the prediction direction) is the same as the table B. However, the deviation of the code length is larger than that of the table B. In the example of FIG. 15, the code numbers having the code lengths 3 to 10 are allocated. That is, in the case of the table D, the possibility of emergence of the prediction directions closer to the horizontal direction is higher than that of the table B, code numbers having shorter code lengths than that of the table B are allocated. The code length of the code number allocated to the prediction direction closer to the vertical direction becomes longer. However, the possibility of emergence is lower than that of the table B, and therefore, as a whole, the possibility of reduction of the code amount is high.

In contrast, for example, when the PU is a vertically long rectangle (when the partition type is hN×2N) and the CU size is large (when larger than 32), the table selection unit 143 selects the table E instead of the table C.

An example of the table E is illustrated in FIG. 16. As illustrated in FIG. 16, in this table E, the order of allocation of the code numbers to the prediction directions (the order of allocation of smaller code numbers to the prediction directions) is the same as the table C. However, the deviation of the code length is larger than that of the table C. In the example of FIG. 16, the code numbers having the code lengths 3 to 10 are allocated. That is, in the case of the table E, the possibility of emergence of the prediction directions closer to the horizontal direction is higher than that of the table C. Therefore, code numbers having shorter code lengths than that of the table C are allocated. Therefore, the code length of the code number allocated to the prediction direction closer to the vertical direction becomes longer. However, the possibility of emergence is lower than that of the table C, and thus, the possibility of reduction of the code amount as a whole is high.

As described above, the VLC table for intra_dir_mode is selected, the table selection unit 143 can suppress the increase in encoding efficiency due to intra_dir_mode.

[Encoding Process Flow]

Each process flow performed by the aforementioned image encoding device 100 will now be described. First, an example of the flow of the encoding process will be described with reference to a flowchart illustrated in FIG. 17.

The A/D conversion unit 101 performs A/D conversion on an input image in step S101. In step S102, the picture rearrangement buffer 102 stores the A/D-converted image and rearranges the order of each picture from the order of display to the order of encoding.

In step S103, the intra prediction unit 114 performs intra prediction process. In step S104, the motion prediction/compensation unit 115 performs the inter motion prediction process. In step S105, the predictive image selection unit 116 selects either a predictive image generated by the intra prediction or a predictive image generated by the inter prediction.

In step S106, the calculator 103 calculates the difference (generates a differential image) between the image rearranged in the process performed in step S103 and the predictive image selected by the process performed in step S105. The data amount of the generated differential image is decreased compared with the original image. The data amount can therefore be compressed as compared to when the image is encoded as is.

In step S107, the orthogonal transform unit 104 performs an orthogonal transform on the differential image generated by the process performed in step S106. Specifically, the orthogonal transform such as the discrete cosine transform or the Karhunen-Loeve transform is performed so that a transform coefficient is output. In step S108, the quantization unit 105 quantizes the orthogonal transform coefficient obtained by the process performed in step S107.

The differential image quantized by the process performed in step S108 is decoded locally as follows. In other words, in step S109, the dequantization unit 108 dequantizes the quantized orthogonal transform coefficient (also, referred to as quantization coefficient) generated in the quantization process of step S108. In step S110, the inverse orthogonal transform unit 109 performs an inverse orthogonal transform on the orthogonal transform coefficient obtained by the inverse orthogonal process performed in step S109 by a characteristic corresponding to the characteristic of the orthogonal transform unit 104. Accordingly, a differential image is restored.

In step S111, the calculator 110 adds the predictive image selected in step S105 to the differential image generated in step S110 to generate a locally decoded image (reconfigured image). In step S112, the loop filter 111 appropriately performs a deblocking filter process and a loop filter process including an adaptive loop filter process and the like with respect to the reconfigured image obtained by the process of step S111, and generates a decoded image.

In step S113, the frame memory 112 stores the decoded image generated by the process of step S112 or the reconfigured image generated by the process of step S111.

In step S114, the lossless encoding unit 106 encodes the orthogonal transform coefficient quantized by the process performed in step S107. That is, the lossless encoding such as variable length encoding or arithmetic encoding is performed on the differential image. Note that the lossless encoding unit 106 encodes information related to the prediction, information related to the quantization, information related to the filter process, and the like, and adds the encoded data to the bit stream.

In step S115, the storage buffer 107 stores the bit stream obtained by the process of step S114. The encoded data accumulated in the storage buffer 107 is read out as appropriate and transmitted to the decoding side through a transmission path and a recording medium.

In step S116, the rate control unit 117 controls the rate of quantization operation by the quantization unit 105 on the basis of the code amount (generated code amount) of the encoded data accumulated in the storage buffer 107 by the process performed in step S115, in order not to cause overflow or underfloor.

The encoding process completes after the process performed in step S116 has been completed.

[Flow of Lossless Encoding Process]

Next, an example of the flow of the lossless encoding process performed in step S114 in FIG. 17 will be described with reference to a flowchart illustrated in FIG. 18.

When the lossless encoding process is started, the encoding unit 131 encodes the quantized coefficient data in step S131. In step S132, the encoding unit 131 encodes a filter coefficient, optimal mode information, and the like.

In step S133, the allocation control unit 121 controls the encoding allocation.

In step S134, the VLC table conversion unit 133 converts mpm_flag into a code number using the VLC table selected by the process of step S133. In step S135, the arithmetic encoding unit 134 applies arithmetic encoding to mpm_flag converted into a code number by the process of step S134.

In step S136, the VLC table conversion unit 135 converts mpm_lr_flag into a code number using the VLC table selected by the process of step S133. In step S137, the arithmetic encoding unit 136 applies arithmetic encoding to mpm_lr_flag converted into a code number by the process of step S136.

In step S138, the VLC table conversion unit 137 converts intra_dir_mode into a code number using the VLC table selected by the process of step S133. In step S139, the arithmetic encoding unit 138 applies arithmetic encoding to intra_dir_mode converted into a code number by the process of step S138.

In step S140, the bit stream generation unit 132 synthesizes the encoded data obtained by the processes of steps S131, S135, S137, and S139 to generate a bit stream.

Figure 17:
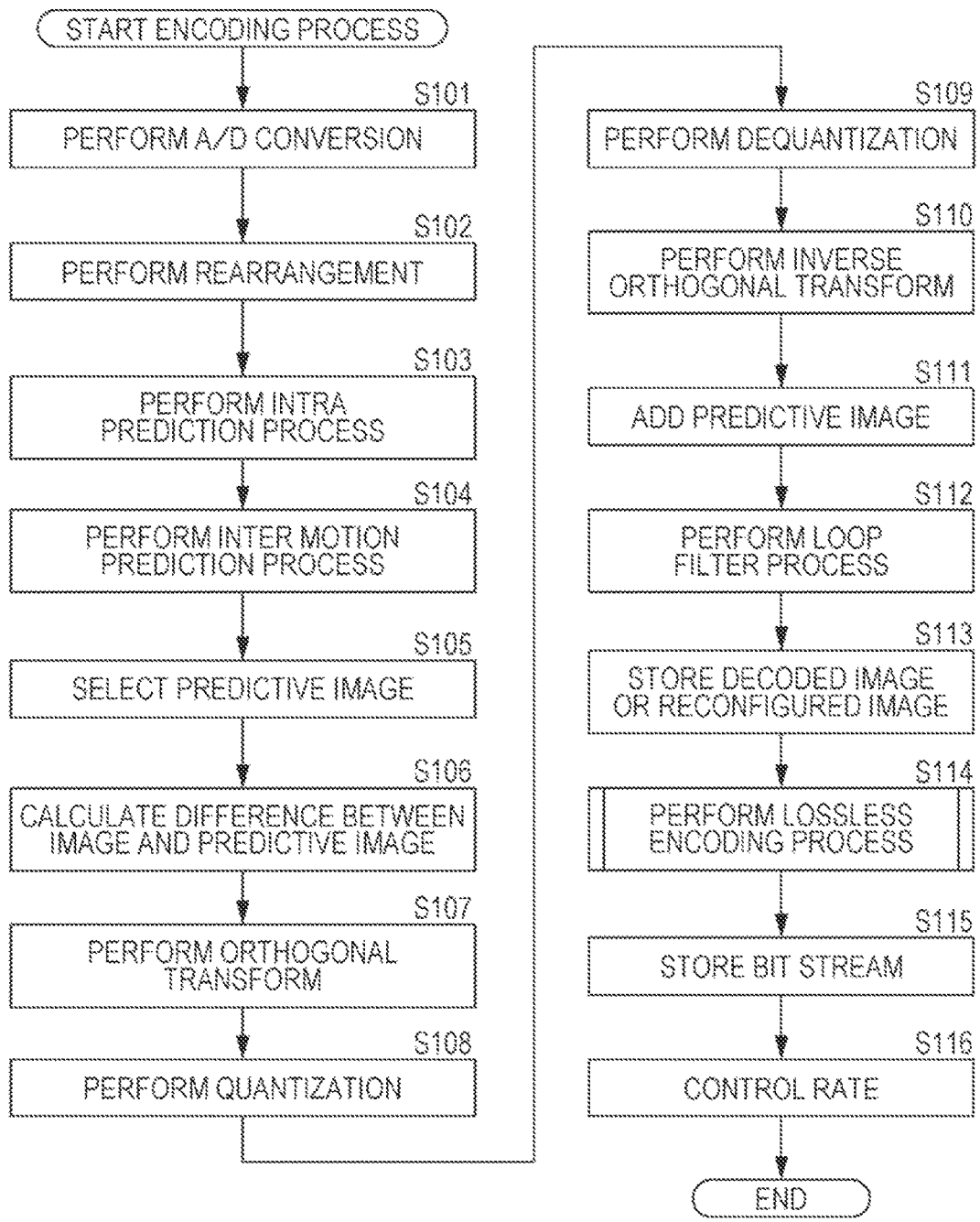
FIG. 17 is a flowchart illustrating an example of a flow of an encoding process.

When the process of step S140 is complete, the bit stream generation unit 132 terminates the lossless encoding process, and returns the process to FIG. 17.

[Flow of Encoding Allocation Control Process]

Next, an example of a flow of an encoding allocation control process executed in step S133 of FIG. 18 will be described with reference to the flowchart of FIG. 19.

When the encoding allocation control process is started, the table selection unit 141 of the allocation control unit 121 selects the VLC table for mpm_flag according to the CU size and the partition type in step S161.

In step S162, the table selection unit 142 selects the VLC table for mpm_lr_flag according to the partition ID and the partition type.

In step S163, the table selection unit 143 selects the VLC table for intra_dir_mode according to the CU size and the partition type.

Figure 18:
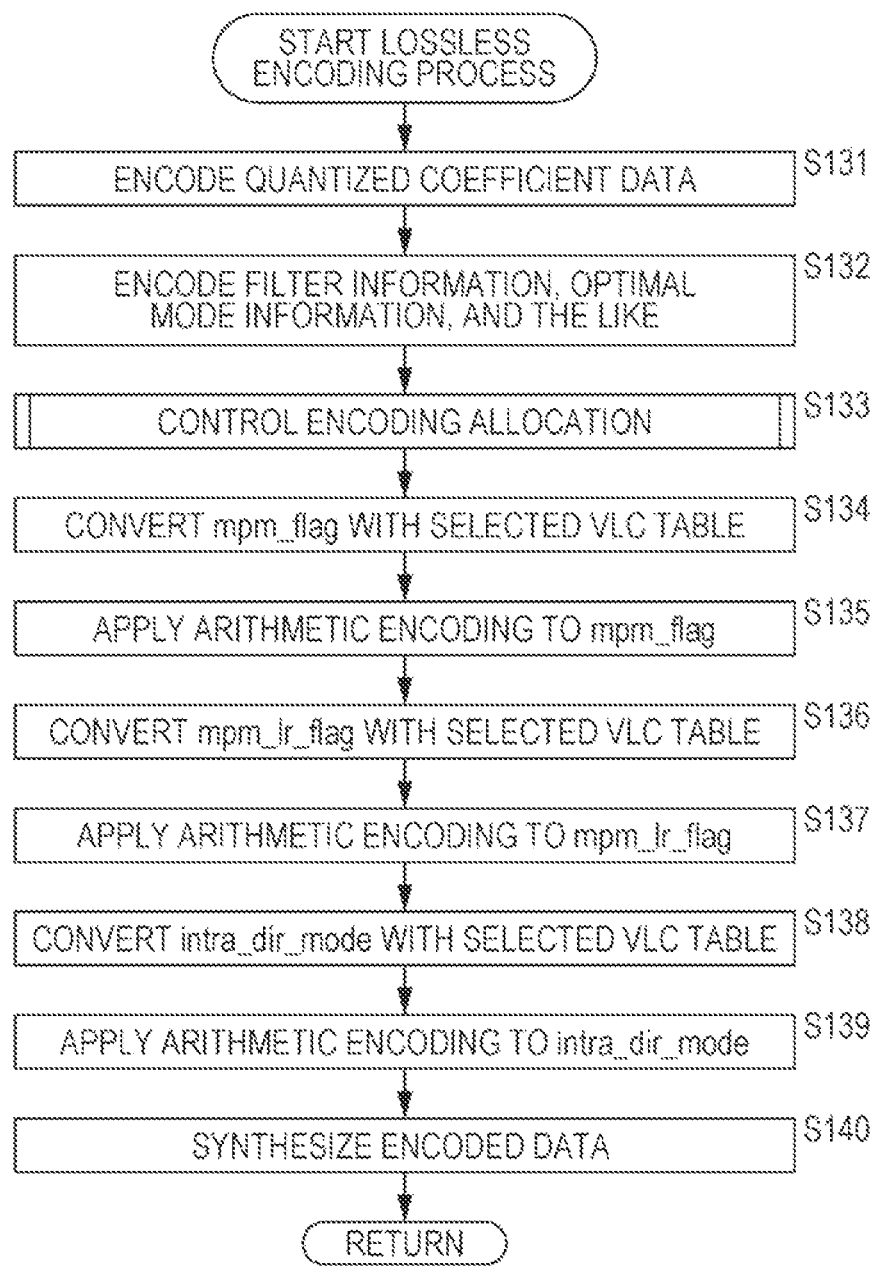
FIG. 18 is a flowchart illustrating an example of a flow of a lossless encoding process.
Figure 19:
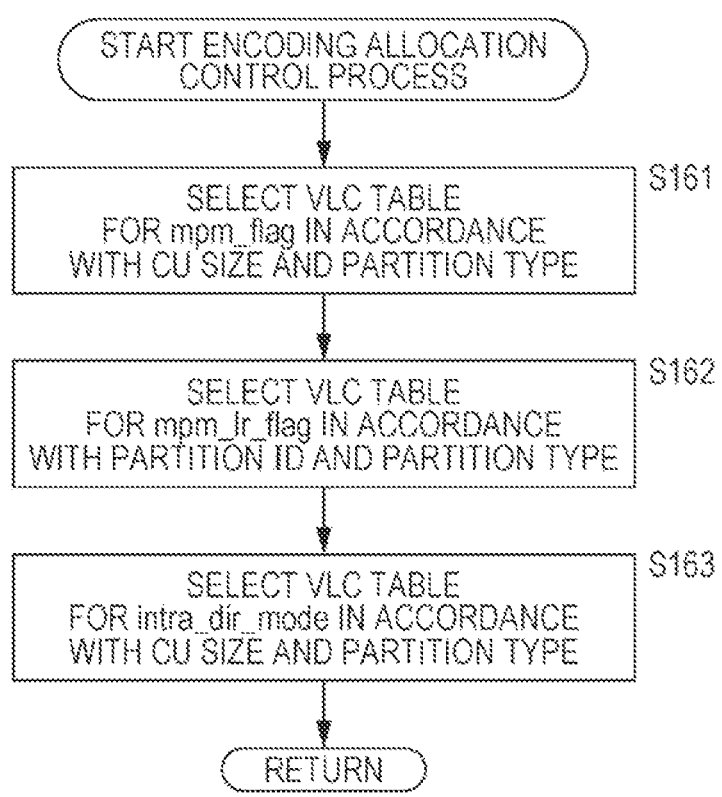
FIG. 19 is a flowchart illustrating a flow of an encoding allocation control process.

When the process of step S163 is complete, the table selection unit 143 terminates the encoding allocation control process, and returns the process to FIG. 18.

As described above, by performing the processes, the allocation control unit 121 can allocate the code numbers so as to improve the encoding efficiency using the deviation of the generation frequency of the values of the parameters related to the intra prediction of mpm_flag, mpm_lr_flag, intra_dir_mode, and the like. That is, the allocation control unit 121 can suppress reduction in encoding efficiency due to the parameters related to the intra prediction by controlling the allocation of the code numbers according to the size and the shape of the PU.

Further, the lossless encoding unit 106 converts and encodes the parameters such as mpm_flag, mpm_lr_flag, intra_dir_mode, and the like into the code numbers according to the allocation.

Accordingly, the image encoding device 100 can suppress the reduction in encoding efficiency due to the parameters related to the intra prediction such as mpm_flag, mpm_lr_flag, and intra_dir_mode.

2. Second Embodiment

[Image Decoding Device]

Figure 20:
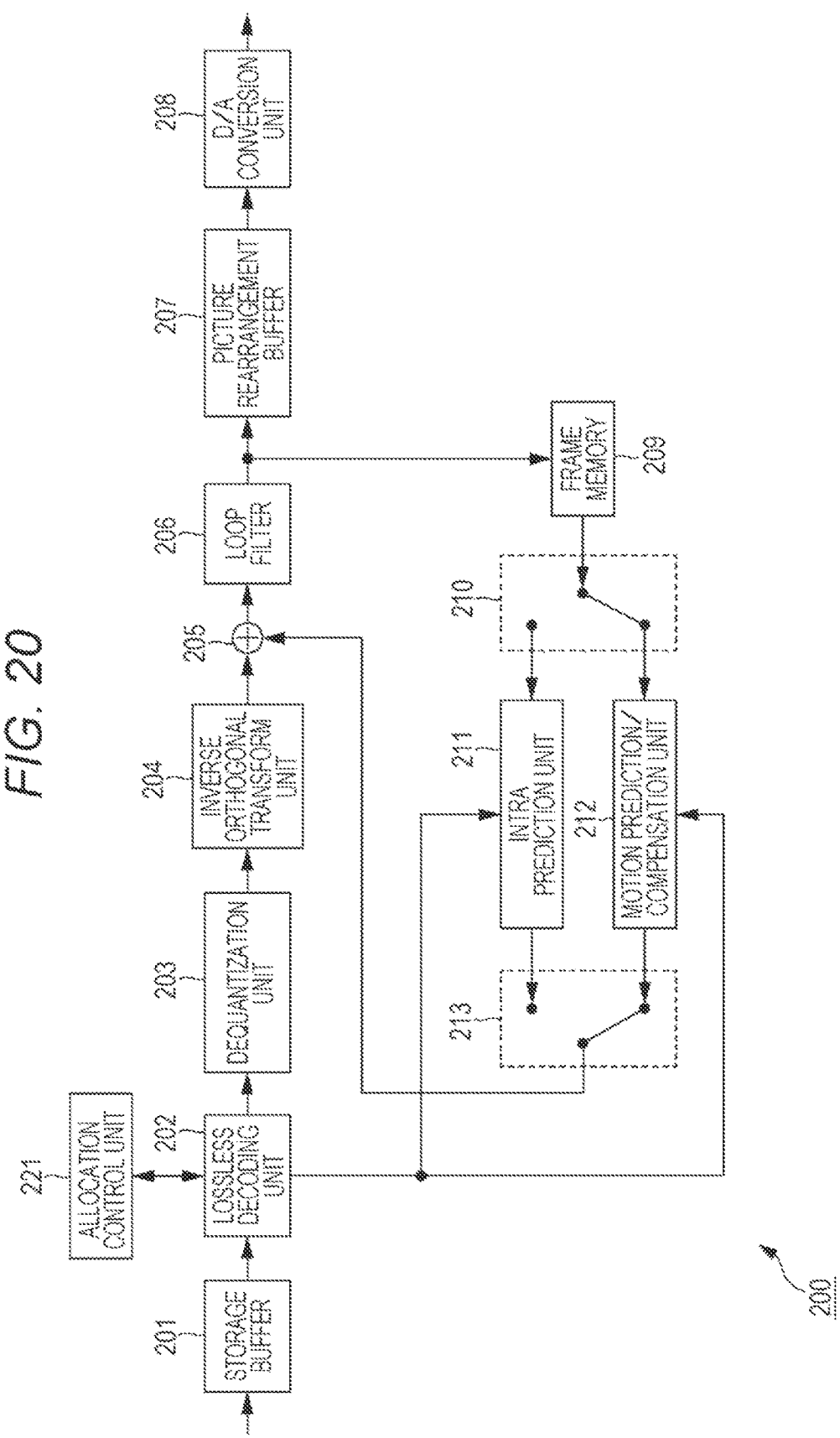
FIG. 20 is a block diagram illustrating an example of a main configuration of an image decoding device.

A process of decoding the data encoded in the aforementioned manner will now be described. FIG. 20 is a block diagram illustrating an example of a main configuration of an image decoding device that is an image processing apparatus corresponding to the image encoding device 100 of FIG. 1.

An image decoding device 200 illustrated in FIG. 20 decodes encoded data generated by the image encoding device 100 by a decoding method corresponding to the encoding method.

As illustrated in FIG. 20, the image decoding device 200 includes a storage buffer 201, a lossless decoding unit 202, a dequantization unit 203, an inverse orthogonal transform unit 204, a calculator 205, a loop filter 206, a picture rearrangement buffer 207, and a D/A conversion unit 208. Further, the image decoding device 200 includes a frame memory 209, a selection unit 210, an intra prediction unit 211, a motion prediction/compensation unit 212, and a selection unit 213.

In addition, the image decoding device 200 includes an allocation control unit 221.

The storage buffer 201 stores encoded data that is transmitted and supplies the encoded data to the lossless decoding unit 202 at a predetermined timing. The lossless decoding unit 202 decodes information, which is encoded by a lossless encoding unit 106 illustrated in FIG. 1 and supplied from the storage buffer 201, by a decoding scheme corresponding to an encoding system employed by the lossless encoding unit 106. The lossless decoding unit 202 supplies quantized coefficient data of a differential image obtained by decoding, to the dequantization unit 203.

Further, the lossless decoding unit 202 refers to information related to the optimal prediction mode obtained by decoding the encoded data, and determines whether the intra prediction mode is selected or the inter prediction mode is selected for the optimal prediction mode. That is, the lossless decoding unit 202 determines whether the prediction mode employed in the transmitted encoded data is the intra prediction or the inter prediction.

The lossless decoding unit 202 supplies information related to the prediction mode to the intra prediction unit 211 or the motion prediction/compensation unit 212 based on the determination result. For example, when the intra prediction mode is selected as the optimal prediction mode in the image encoding device 100, the lossless decoding unit 202 supplies the intra prediction information that is information related to the selected intra prediction mode supplied from the encoding side to the intra prediction unit 211. Further, for example, when the inter prediction mode is selected as the optimal prediction mode in the image encoding device 100, the lossless decoding unit 202 supplies the inter prediction information that is information related to the selected inter prediction mode supplied from the encoding side to the motion prediction/compensation unit 212.

Further, the lossless decoding unit 202 supplies information related to the size and the shape of the PU such as the CU size, the partition type, and the partition ID to the allocation control unit 221.

The dequantization unit 203 dequantizes the quantized coefficient data obtained by being decoded by the lossless decoding unit 202. That is, the dequantization unit 203 performs the dequantization by a system corresponding to the quantization system of the quantization unit 105 of FIG. 1. The dequantization unit 203 supplies the coefficient data obtained by the dequantization to the inverse orthogonal transform unit 204.

The inverse orthogonal transform unit 204 performs an inverse orthogonal transform on the coefficient data supplied from the dequantization unit 203 by a scheme corresponding to an orthogonal transform scheme employed by an orthogonal transform unit 104 illustrated in FIG. 1. The inverse orthogonal transform unit 204 obtains a differential image corresponding to the differential image before the orthogonal transform in the image encoding device 100 by the inverse orthogonal transform process.

The differential image obtained by the inverse orthogonal transform is supplied to the calculator 205. A predictive image from the intra prediction unit 211 or the motion prediction/compensation unit 212 is also supplied to the calculator 205 through the selection unit 213.

The calculator 205 adds the differential image and the predictive image, and obtains a reconfigured image corresponding to the image before the predictive image is subtracted by the calculator 103 of the image encoding device 100. The calculator 205 supplies the reconfigured image to the loop filter 206.

The loop filter 206 appropriately applies a deblocking filter process and a loop filter process including an adaptive loop filter process and the like to the supplied reconfigured image to generate a decoded image. For example, the loop filter 206 removes block distortion by performing the deblocking filter process on the reconfigured image. The loop filter 206 also improves image quality by performing the loop filter process on the outcome of the deblocking filter process (the reconfigured image from which the block distortion has been removed) by using a Wiener Filter, for example.

Note that the type of the filter process performed by the loop filter 206 is an arbitrary type, and a filter process other than the above-described process may be performed. The loop filter 206 may also perform the filter process by using a filter coefficient supplied from the image encoding device 100 illustrated in FIG. 1.

The loop filter 206 supplies the decoded image that is a filter process result to the picture rearrangement buffer 207 and the frame memory 209. Note that the filter process by the loop filter 206 can be omitted. That is, the output of the calculator 205 can be stored in the frame memory 209 without being subjected to the filter process. For example, the intra prediction unit 211 uses a pixel value of a pixel included in the image as a pixel value of a surrounding image.

The picture rearrangement buffer 207 rearranges the supplied decoded image. That is, the order of frames rearranged into the encoding order by a picture rearrangement buffer 102 illustrated in FIG. 1 is now rearranged back into the original order of display. The D/A conversion unit 208 applies D/A conversion to the decoded image supplied from the picture rearrangement buffer 207, and outputs and displays the converted image on a display (not illustrated).

The frame memory 209 stores the supplied reconfigured image and decoded image. In addition, the frame memory 209 supplies the stored reconfigured image and decoded image to the intra prediction unit 211 and the motion prediction/compensation unit 212 through the selection unit 210 at a predetermined timing or based on a request from an outside such as the intra prediction unit 211 and the motion prediction/compensation unit 212.

The intra prediction unit 211 basically performs a similar process to the intra prediction unit 114 of FIG. 1. Note that the intra prediction unit 211 performs intra prediction only on a region where a predictive image has been generated by the intra prediction in encoding.

The motion prediction/compensation unit 212 performs an inter motion prediction process based on the inter prediction information supplied from the lossless decoding unit 202 to generate a predictive image. Note that the motion prediction/compensation unit 212 performs the inter motion prediction process only on a region where the inter prediction has been performed in encoding, based on the inter prediction information supplied from the lossless decoding unit 202.

The intra prediction unit 211 or the motion prediction/compensation unit 212 supplies the generated predictive image to the calculator 205 through the selection unit 213 in each region in the prediction processing unit.

The selection unit 213 supplies the predictive image supplied from the intra prediction unit 211 or the predictive image supplied from the motion prediction/compensation unit 212 to the calculator 205.

The allocation control unit 221 controls a value of each parameter to be allocated to a code number in applying arithmetic decoding to the code numbers of information related to mpm_flag, mpm_lr_flag, and intra_dir_mode, for example by the lossless decoding unit 202. To be specific, for example, the allocation control unit 221 selects the VLC table (variable length encoding table) that converts the values of mpm_flag, mpm_lr_flag, and intra_dir_mode into code numbers. At that time, the allocation control unit 221 selects the VLC table according to the information related to the size and the shape of the PU of interest to be predicted supplied from the encoding side. The lossless decoding unit 202 performs a VLC table inverse conversion process where the code numbers are returned to original values using the VLC table selected by the allocation control unit 221.

[Lossless Decoding Unit and Allocation Control Unit]

Figure 21:
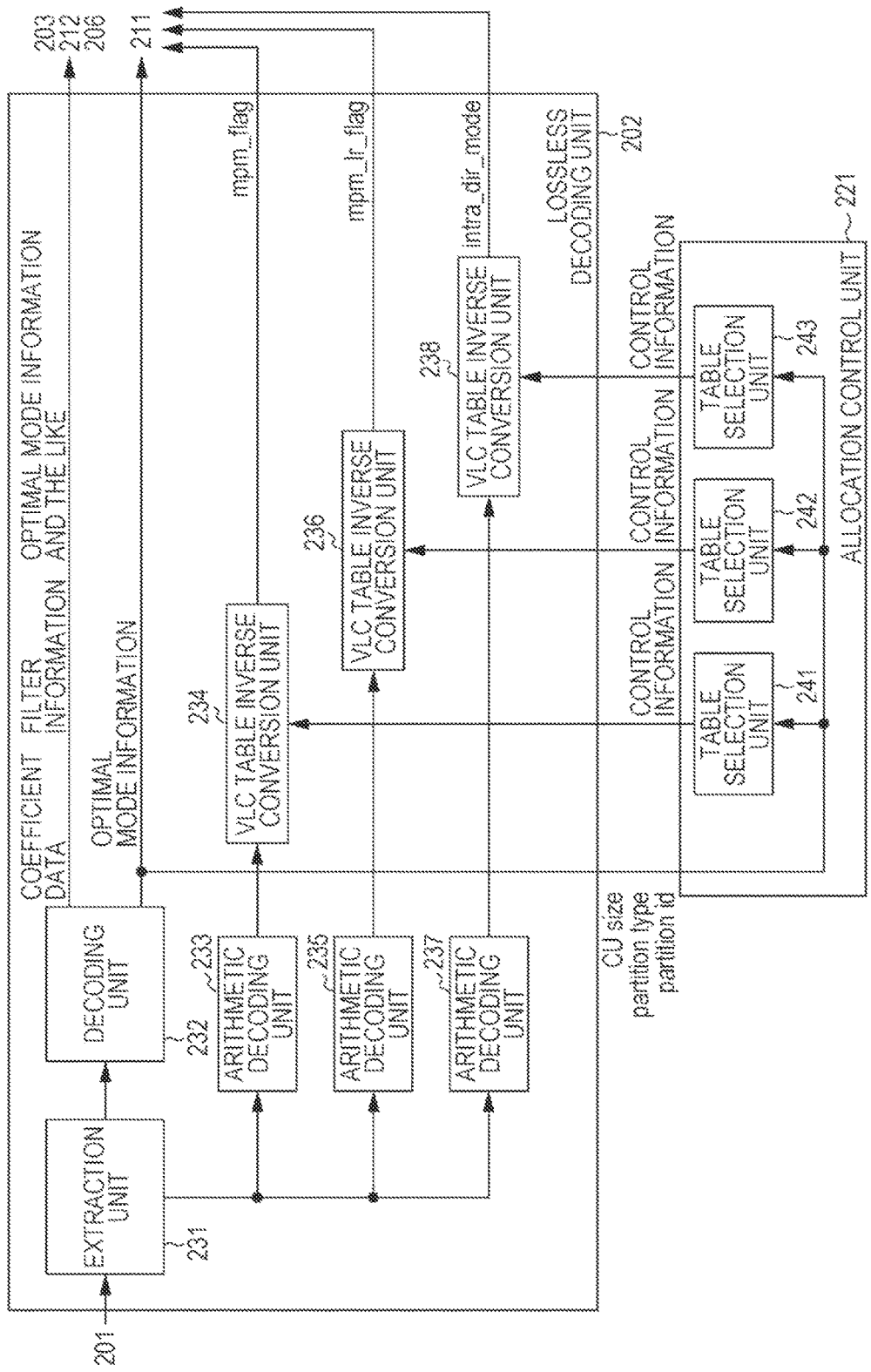
FIG. 21 is a block diagram illustrating an example of a main configuration of a lossless decoding unit and an allocation control unit.

FIG. 21 is a block diagram illustrating an example of a main configuration of the lossless decoding unit 202 and the allocation control unit 221.

As illustrated in FIG. 21, the lossless decoding unit 202 includes an extraction unit 231, a decoding unit 232, an arithmetic decoding unit 233, a VLC table inverse conversion unit 234, an arithmetic decoding unit 235, a VLC table inverse conversion unit 236, an arithmetic decoding unit 237, and a VLC table inverse conversion unit 238.

Further, the allocation control unit 221 includes table selection units 241 to 243.

The extraction unit 231 extracts encoded data of the code number converted from mpm_flag, encoded data of the code number converted from mpm_lr_flag, and encoded data of the code number converted from intra_dir_mode from the bit stream supplied from the storage buffer 201.

The extraction unit 231 supplies the extracted encoded data of the code number converted from mpm_flag to the arithmetic decoding unit 233. In addition, the extraction unit 231 supplies the extracted encoded data of the code number converted from mpm_lr_flag to the arithmetic decoding unit 235. Further, the extraction unit 231 supplies the extracted encoded data of the code number converted from intra_dir_mode to the arithmetic decoding unit 237.

In addition, the extraction unit 231 supplies a remaining bit stream to the decoding unit 232.

The decoding unit 232 decodes the supplied bit stream to obtain the quantized coefficient data, the filter information, and the optimal mode information when the optimal mode is the inter prediction, and the like, which are transmitted from the encoding side. The decoding unit 232 supplies the quantized coefficient data to the dequantization unit 203. In addition, when the optimal mode is the inter prediction, the decoding unit 232 supplies the optimal mode information to the motion prediction/compensation unit 212. Further, the decoding unit 232 supplies the filter information including a filter coefficient and the like, which has been used in the encoding side, to the loop filter 206.

Further, the decoding unit 232 decodes the supplied bit stream to obtain the optimal mode information and the like when the optimal mode is the intra prediction. The decoding unit 232 supplies the optimal mode information to the intra prediction unit 211.

In addition, the decoding unit 232 supplies the information related to the size and the shape of the PU such as the CU size (CU size), the partition type, and the partition ID (partition id), which has been obtained by decoding the supplied bit stream, to the allocation control unit 221.

The arithmetic decoding unit 233 applies arithmetic decoding to the encoded data of the code number converted from mpm_flag and supplied from the extraction unit 231 to obtain the code number converted from the mpm_flag. The method of arithmetic decoding corresponds to the method of arithmetic encoding by the arithmetic encoding unit 134. The arithmetic decoding unit 233 supplies the code number converted from mpm_flag obtained by being decoded to the VLC table inverse conversion unit 234.

The arithmetic decoding unit 235 applies arithmetic decoding to the encoded data of the code number converted from mpm_lr_flag and supplied from the extraction unit 231 to obtain the code number converted from mpm_lr_flag. The method of arithmetic decoding corresponds to the method of arithmetic encoding by the arithmetic encoding unit 136. The arithmetic decoding unit 235 supplies the code number converted from mpm_flag obtained by being decoded to the VLC table inverse conversion unit 236.

The arithmetic decoding unit 237 applies arithmetic decoding to the encoded data of the code number converted from intra_dir_mode and supplied from the extraction unit 231 to obtain the code number converted from intra_dir_mode. The method of arithmetic decoding corresponds to the method of arithmetic encoding by the arithmetic encoding unit 138. The arithmetic decoding unit 237 supplies the code number converted from mpm_flag obtained by being decoded to the VLC table inverse conversion unit 238.

The table selection unit 241 selects the VLC table to be used in the inverse conversion process in the VLC table inverse conversion unit 234 in accordance with the CU size and the partition type. That is, the table selection unit 241 stores a plurality of candidates of the VLC tables to be used in the VLC table inverse conversion unit 234, selects one from the plurality of candidates based on the information supplied from the decoding unit 232, and supplies it to the VLC table inverse conversion unit 234. Note that this table selection method is similar to that of the table selection unit 141. The table selection unit 241 selects the VLC table for each PU.

Note that information indicating the VLC table selected by the table selection unit 241 may be supplied to the VLC table inverse conversion unit 234 instead of supplying the selected VLC table as it is to the VLC table inverse conversion unit 234. In that case, the VLC table inverse conversion unit 234 stores a plurality of VLC tables to be a candidate (the same VLC tables stored in the table selection unit 241) in advance, selects one from the plurality of VLC tables according to the information supplied from the table selection unit 241, and uses it in the conversion process.

The table selection unit 242 selects the VLC table to be used in the inverse conversion process in the VLC table inverse conversion unit 236 in accordance with the CU size and the partition type. That is, the table selection unit 242 stores a plurality of candidates of the VLC tables to be used in the VLC table inverse conversion unit 236, selects one from the plurality of candidates based on the information supplied from the decoding unit 232, and supplies it to the VLC table inverse conversion unit 236. Note that the table selection method is similar to that of the table selection unit 142. The table selection unit 242 selects the VLC table for each PU.

Note that information indicating the VLC table selected by the table selection unit 242 may be supplied to the VLC table inverse conversion unit 236 rather than supplying the selected VLC table as it is to the VLC table inverse conversion unit 236. In that case, the VLC table inverse conversion unit 236 stored a plurality of the VLC tables to be a candidate (the same VLC tables stored in the table selection unit 242) in advance, selects one from the plurality of the VLC tables according to the information supplied from the table selection unit 242, and uses it in the conversion process.

The table selection unit 243 selects the VLC table to be used in the inverse conversion process in the VLC table inverse conversion unit 238 in accordance with the CU size and the partition type. That is, the table selection unit 243 stores a plurality of candidates of the VLC tables to be used in the VLC table inverse conversion unit 238, selects one from the plurality of candidates based on the information supplied from the decoding unit 232, and supplies it to the VLC table inverse conversion unit 238. Note that the table selection method is similar to that of the table selection unit 143. The table selection unit 243 selects the VLC table for each PU.

Note that information indicating the VLC table selected by the table selection unit 243 may be supplied to the VLC table inverse conversion unit 238 rather than supplying the selected VLC table as it is to the VLC table inverse conversion unit 238. In that case, the VLC table inverse conversion unit 238 stores a plurality of VLC tables to be a candidate (the same VLC tables stored in the table selection unit 242) in advance, selects one from the plurality of VLC tables according to the information supplied from the table selection unit 243, and uses it in the conversion process.

The VLC table inverse conversion unit 234 inversely converts the code number converted from mpm_flag and supplied from the arithmetic decoding unit 233 using the VLC table selected by the table selection unit 241 to obtain mpm_flag. That is, the VLC table inverse conversion unit 234 performs an inverse process to the VLC table conversion by the VLC table conversion unit 133. The VLC table inverse conversion unit 234 supplies the mpm_flag obtained by the inverse conversion process to the intra prediction unit 211.

Further, the VLC table inverse conversion unit 236 inversely converts the code number converted from mpm_lr_flag and supplied from the arithmetic decoding unit 235 using the VLC table selected by the table selection unit 242 to obtain mpm_lr_flag. That is, the VLC table inverse conversion unit 236 performs an inverse process to the VLC table conversion by the VLC table conversion unit 135. The VLC table inverse conversion unit 236 supplies mpm_lr_flag obtained by the inverse conversion process to the intra prediction unit 211.

Further, the VLC table inverse conversion unit 238 inversely converts the code number converted from intra_dir_mode and supplied from the arithmetic decoding unit 237 using the VLC table selected by the table selection unit 243 to obtain intra_dir_mode. That is, the VLC table inverse conversion unit 238 performs an inverse process to the VLC table conversion by the VLC table conversion unit 137. The VLC table inverse conversion unit 238 supplies intra_dir_mode obtained by the inverse conversion process to the intra prediction unit 211.

As described above, the arithmetic decoding unit 233, the arithmetic decoding unit 235, and the arithmetic decoding unit 237 respectively perform arithmetic decoding corresponding to the arithmetic encoding performed by the arithmetic encoding unit 134, the arithmetic encoding unit 136, and the arithmetic encoding unit 138 of FIG. 7.

Further the table selection units 241 to 243 select tables by a similar method to the VLC table selection method by the table selection units 141 to 143.

Further, the VLC table inverse conversion unit 234, the VLC table inverse conversion unit 236, and the VLC table inverse conversion unit 238 respectively perform inverse processes to the VLC table conversion performed by the VLC table conversion unit 133, the VLC table conversion unit 135, and the VLC table conversion unit 137.

Therefore, the lossless decoding unit 202 can correctly decode the encoded bit stream by the lossless encoding unit 106. Accordingly, the image decoding device 200 can suppress the reduction in encoding efficiency using the deviation of the generation frequency (generation probability) of each value of the parameters related to the intra prediction such as mpm_flag, mpm_lr_flag, and intra_dir_mode.

[Decoding Process Flow]

The flow of each process performed by the aforementioned image decoding device 200 will now be described. First, an example of the flow of a decoding process will be described with reference to a flowchart illustrated in FIG. 22.

In step S201, the storage buffer 201 accumulates the transmitted bit stream once the decoding process has been started. In step S202, the lossless decoding unit 202 decodes the bit stream supplied from the storage buffer 201 (the encoded differential image information). At this time, various types of information such as information related to the prediction mode information other than the differential image information included in the bit stream are also decoded.

In step S203, the dequantization unit 203 dequantizes the quantized orthogonal transform coefficient obtained by the process performed in step S202. In step S204, the inverse orthogonal transform unit 204 performs an inverse orthogonal transform on the orthogonal transform coefficient dequantized in step S203.

In step S205, the intra prediction unit 211 or the motion prediction/compensation unit 212 uses the information supplied to perform the prediction process. In step S206, the calculator 205 adds the predictive image generated in step S205 to the differential image information obtained by the inverse orthogonal transform performed in step S204. Accordingly, the reconfigured image is generated.

In step S207, the loop filter 206 appropriately performs a loop filter process including a deblocking filter process and an adaptive loop filter process on the reconfigured image obtained in step S206.

In step S208, the picture rearrangement buffer 207 rearranges the decoded image generated by being subjected to the filter process in step S207. Namely, the order of frames rearranged for encoding by the picture rearrangement buffer 102 in the image encoding device 100 is rearranged back to the original order of display.

In step S209, the D/A conversion unit 208 applies D/A conversion to the decoded image, the order of frames of which have been rearranged. The decoded image is output to and displayed on a display (not illustrated).

In step S210, the frame memory 209 stores the decoded image obtained by being subjected to the filter process in step S207. This decoded image is used as a reference image in the inter prediction process.

The decoding process is completed once the process in step S210 has been completed.

[Flow of Lossless Decoding Process]

Next, an example of a flow of a lossless decoding process performed in step S202 of FIG. 22 will be described with reference to the flowchart of FIG. 23.

When the lossless decoding process is started, in step S231, extraction unit 231 extracts the encoded data of mpm_flag, mpm_lr_flag, and intra_dir_mode from the bit stream.

In step S232, the decoding unit 232 decodes the encoded data of the quantized coefficient data. In step S233, the decoding unit 232 decodes the encoded data of the filter information, the optimal mode information, and the like.

In step S234, the allocation control unit 221 controls the decoding allocation.

In step S235, the arithmetic decoding unit 233 applies arithmetic decoding to the encoded data of mpm_flag extracted in step S231. In step S236, the VLC table inverse conversion unit 234 inversely converts the code number (symbol) of mpm_flag obtained by being subjected to arithmetic decoding in step S235, using the VLC table selected by the process of step S234, to obtain mpm_flag.

In step S237, the arithmetic decoding unit 235 applies arithmetic decoding to the encoded data of mpm_lr_flag extracted in step S231. In step S238, the VLC table inverse conversion unit 236 inversely converts the code number (symbol) of mpm_lr_flag obtained by being subjected to arithmetic decoding in step S237, using the VLC table selected by the process of step S234, to obtain mpm_lr_flag.

In step S239, the arithmetic decoding unit 237 applies arithmetic decoding to the encoded data of intra_dir_mode extracted in step S231. In step S240, the VLC table inverse conversion unit 238 inversely converts the code number (symbol) of mpm_flag obtained by being subjected to arithmetic decoding in step S239, using the VLC table selected by the process of step S234, to obtain intra_dir_mode.

Figure 22:
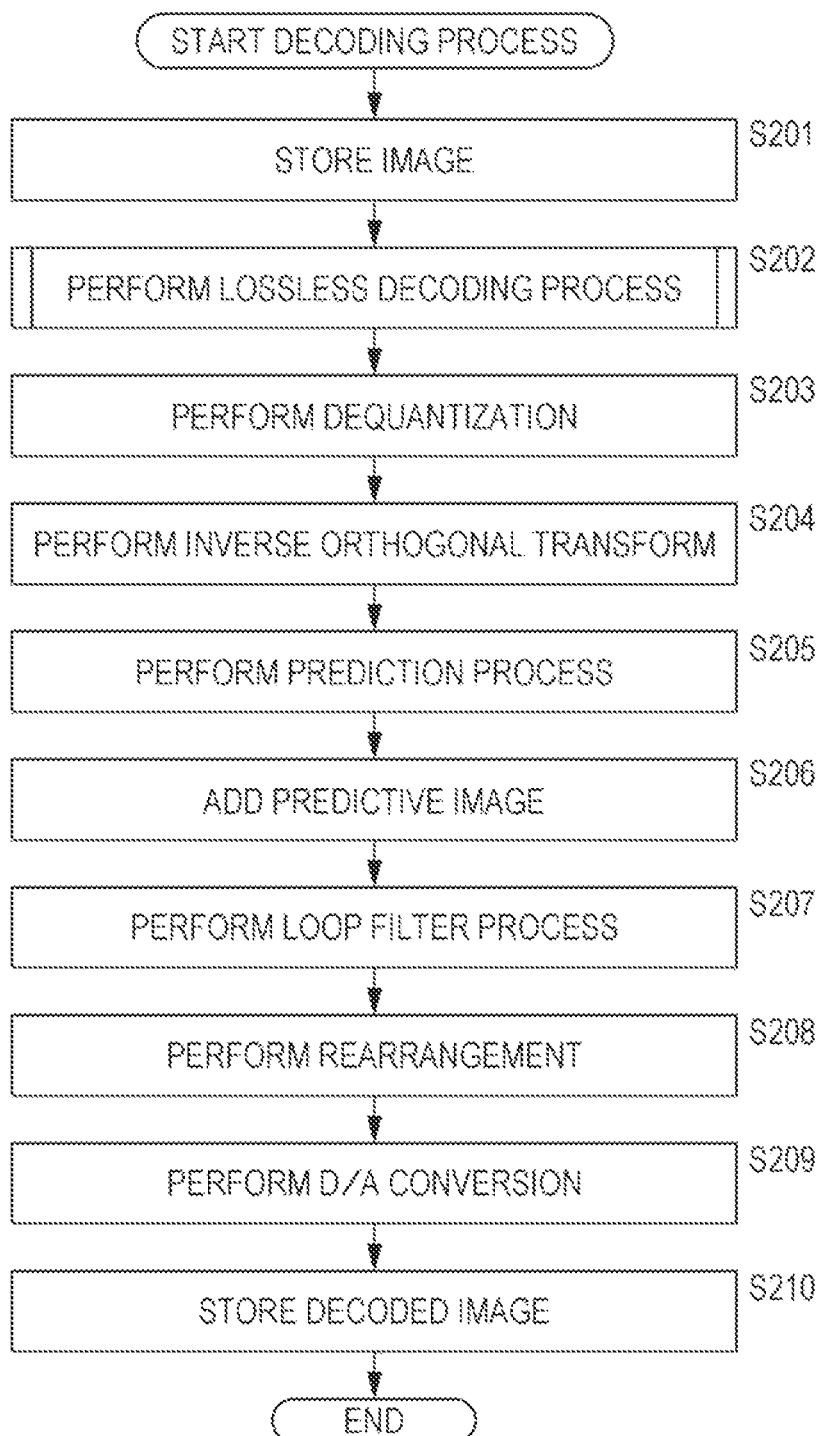
FIG. 22 is a flowchart illustrating an example of a flow of a decoding process.
Figure 23:
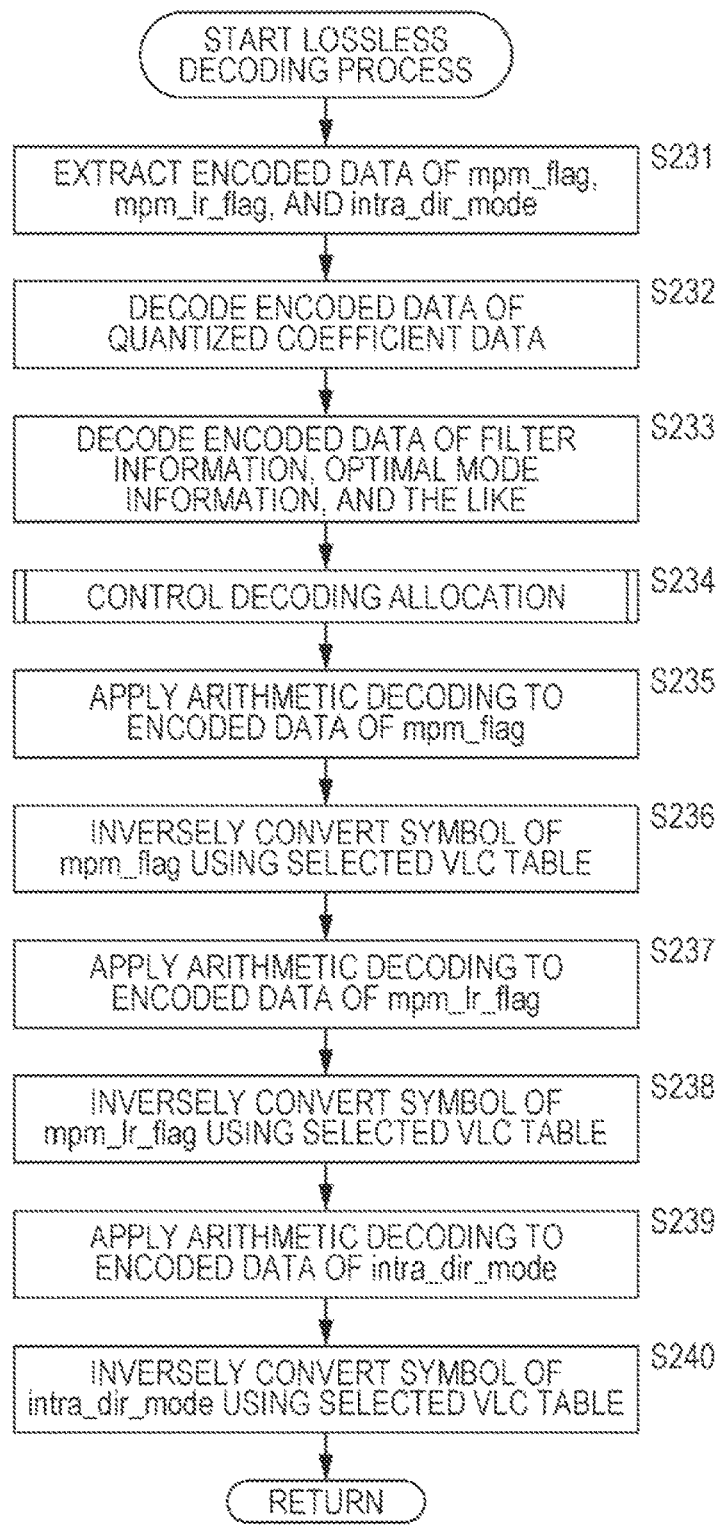
FIG. 23 is a flowchart illustrating an example of a flow of a prediction process.

When the process of step S240 is complete, the VLC table inverse conversion unit 238 terminates the lossless decoding process, and returns the process to FIG. 22.

[Flow of Decoding Allocation Control Process]

Figure 24:
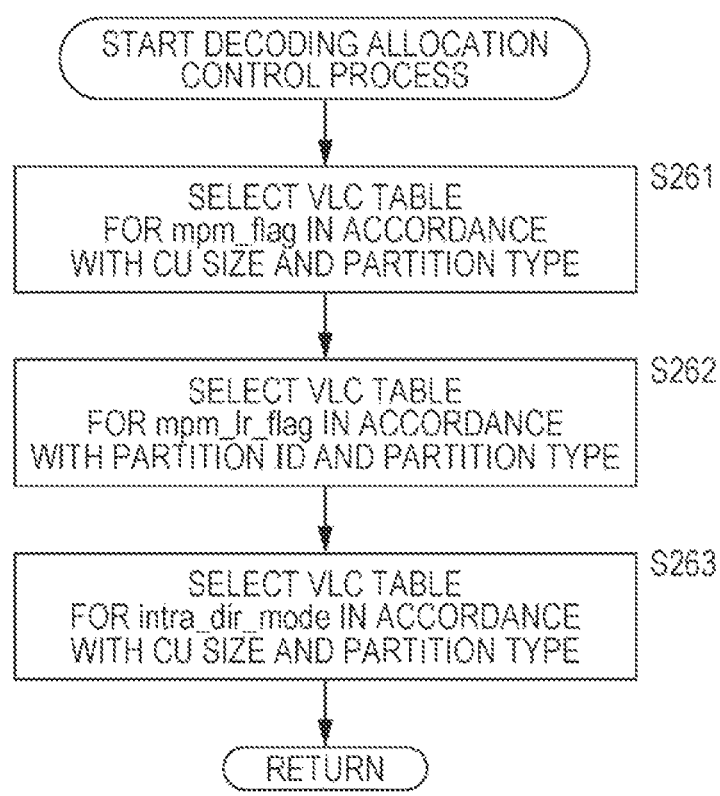
FIG. 24 is a flowchart illustrating a flow of a decoding allocation control process.

Next, an example of a flow of a decoding allocation control process executed in step S234 of FIG. 23 will be described with reference to the flowchart of FIG. 24.

When a decoding allocation control process is started, in step S261, the table selection unit 241 selects the VLC table for mpm_flag in accordance with the CU size and the partition type supplied from the encoding side.

In step S262, the table selection unit 242 selects the VLC table for mpm_lr_flag in accordance with the partition ID and the partition unit supplied from the encoding side.

In step S263, the table selection unit 243 selects the VLC table for intra_dir_mode in accordance with the CU size and the partition unit supplied from the encoding side. When the process of step S263 is complete, the table selection unit 243 terminates the decoding allocation control process, and returns the process to FIG. 23.

By performing the processes as described above, the lossless decoding unit 202 can correctly decode the encoded bit stream by the lossless encoding unit 106. Accordingly, the image decoding device 200 can suppress the reduction in encoding efficiency using the deviation of the generation frequency (generation probability) of each value of the parameters related to the intra prediction such as mpm_flag, mpm_lr_flag, and intra_dir_mode.

3. Third Embodiment

[Control of Context Probability Model]

In the above description, the code number to be allocated to the value of the parameter related to the intra prediction such as mpm_flag, mpm_lr_flag, and intra_dir_mode are controlled in accordance with the size and the shape of the PU for the purpose of improvement of encoding efficiency. However the control of the code amount may be performed by something other than the VLC table.

That is, the important thing in the present technology is to suppress the code amount using the deviation of the generation probability of a value of a flag related to the MPM or the prediction direction caused by the size and the shape of the PU. Therefore, any process or parameter may be controlled as long as the code amount can be decreased similarly to the examples described in the first and second embodiments.

For example, the context probability model of the arithmetic encoding may be switched according to the size or the shape of the PU.

[Lossless Encoding Unit and Allocation Control Unit]

Figure 25:
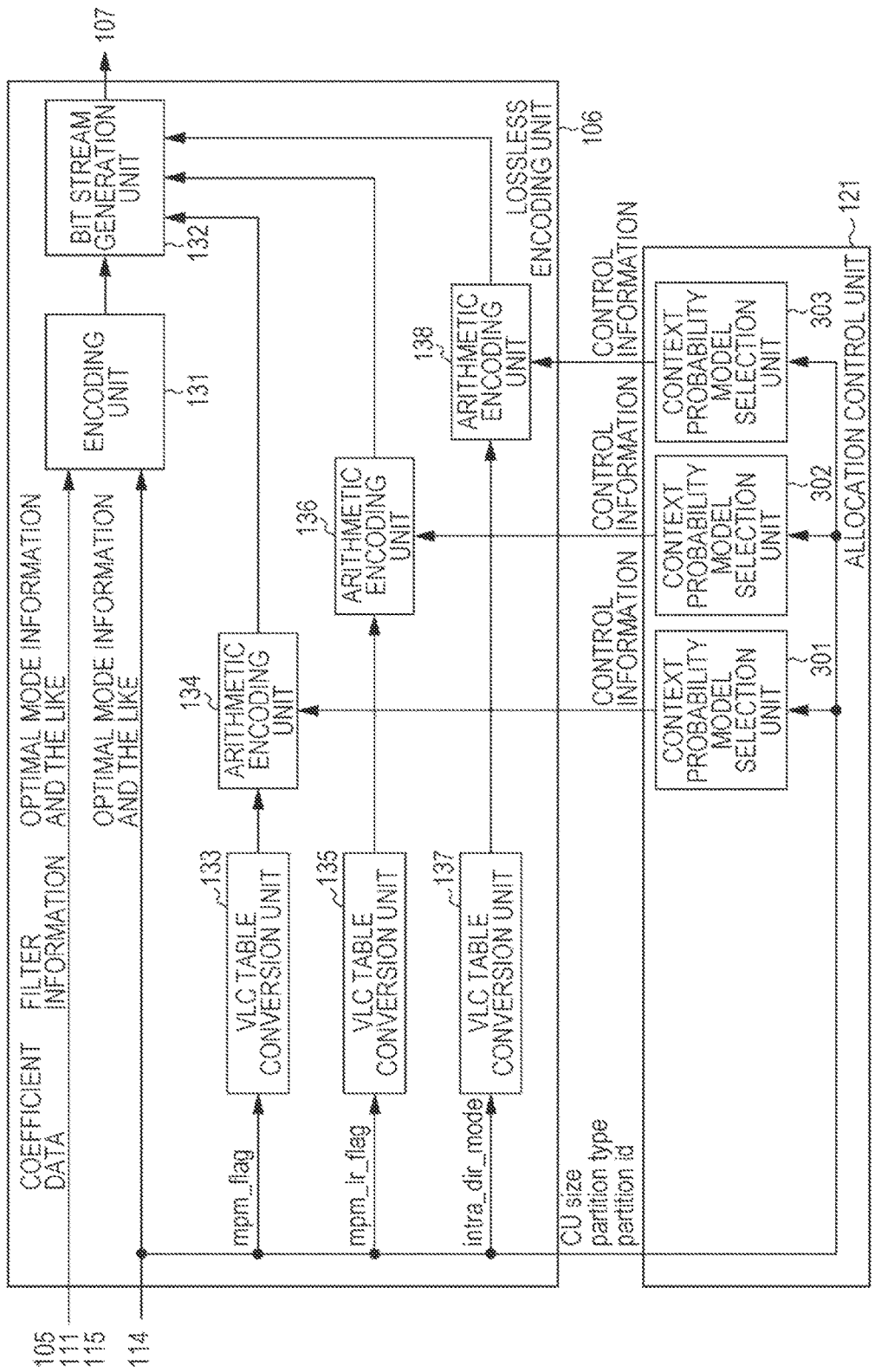
FIG. 25 is a block diagram illustrating another configuration example of the lossless encoding unit and the allocation control unit.

FIG. 25 is a block diagram illustrating an example of a main configuration of the lossless encoding unit 106 and the allocation control unit 121 in the above case.

As illustrated in FIG. 25, in this case, the allocation control unit 121 includes context probability model selection units 301 to 303 instead of the table selection units 141 to 143.

The context probability model selection unit 301 controls the context probability model to be used in the arithmetic encoding unit 134 based on the CU size and the partition type (information related to the size and the shape of the PU) supplied from the intra prediction unit 114. To be specific, the context probability model selection unit 301 stores a plurality of candidates of the context probability models to be used by the arithmetic encoding unit 134 in advance, selects a model having a highest possibility of a minimum code amount of mpm_flag from the plurality of candidates based on the information related to the size and the shape of the PU, and supplies it to the arithmetic encoding unit 134.

In this case, selection of the VLC table is not performed. The VLC table conversion unit 133 performs VLC table conversion of mpm_flag using a predetermined VLC conversion table. The arithmetic encoding unit 134 applies arithmetic encoding to the code number obtained by conversion of mpm_flag in the VLC table conversion unit 133, using the context probability model selected by the context probability model selection unit 301, to generate encoded data. The arithmetic encoding unit 134 supplies the encoded data to the bit stream generation unit 132.

Note that the arithmetic encoding unit 134 may store a plurality of candidates of the context probability models in advance, the context probability model selection unit 301 may select the context probability model to be used, and supply information indicating the selected context probability model to the arithmetic encoding unit 134, and the arithmetic encoding unit 134 may select the context probability model specified by the information from the candidates and use it.

The context probability model selection unit 302 controls the context probability model to be used in the arithmetic encoding unit 136 based on the partition ID and the partition type (information related to the shape of the PU) supplied from the intra prediction unit 114. To be specific, the context probability model selection unit 302 stores a plurality of candidates of the context probability models to be used by the arithmetic encoding unit 136 in advance, selects a model having a highest possibility of a minimum code amount of mpm_lr_flag from the plurality of candidates based on the information related to the size and the shape of the PU, and supplies it to the arithmetic encoding unit 136.

In this case, selection of the VLC table is not performed. The VLC table conversion unit 135 performs VLC table conversion of mpm_lr_flag using a predetermined VLC conversion table. The arithmetic encoding unit 136 applies arithmetic encoding to the code number obtained by conversion of mpm_lr_flag in the VLC table conversion unit 135, using the context probability model selected by the context probability model selection unit 302, to generate encoded data. The arithmetic encoding unit 136 supplies the encoded data to the bit stream generation unit 132.

Note that the arithmetic encoding unit 136 may store a plurality of candidates of the context probability models in advance, the context probability model selection unit 302 may select the context probability model to be used, and supplies information indicating the selected context probability model to the arithmetic encoding unit 136, and the arithmetic encoding unit 136 may select the context probability model specified by the information from the candidates and use it.

The context probability model selection unit 303 controls the context probability model to be used in the arithmetic encoding unit 138 based on the partition ID and the partition type (information related to the shape of the PU) supplied from the intra prediction unit 114. To be specific, the context probability model selection unit 303 stores a plurality of candidates of the context probability models to be used by the arithmetic encoding unit 138 in advance, selects a model having a highest possibility of a minimum code amount of intra_dir_mode from the plurality of candidates based on the information related to the size and the shape of the PU, and supplies it to the arithmetic encoding unit 138.

In this case, selection of the VLC table is not performed. The VLC table conversion unit 137 performs VLC table conversion of intra_dir_mode using a predetermined VLC conversion table. The arithmetic encoding unit 138 applies arithmetic encoding to the code number obtained by conversion of intra_dir_mode in the VLC table conversion unit 137, using the context probability model selected by the context probability model selection unit 303, to generate the encoded data. The arithmetic encoding unit 138 supplies the encoded data to the bit stream generation unit 132.

Note that the arithmetic encoding unit 138 may store a plurality of candidates of the context probability models in advance, the context probability model selection unit 303 may select the context probability model to be used, and supply information indicating the selected context probability model to the arithmetic encoding unit 138, and the arithmetic encoding unit 138 may select the context probability model specified by the information from the plurality of candidates, and use it.

[Flow of Lossless Encoding Process]

Next, an example of a flow of a lossless encoding process in this case will be described with reference to the flowchart of FIG. 26.

When a lossless encoding process is started, in step S301, the encoding unit 131 encodes the quantize coefficient data. In step S302, the encoding unit 131 encodes the filter coefficient, the optimal mode information, and the like.

In step S303, the allocation control unit 121 controls the encoding allocation.

In step S304, the VLC table conversion unit 133 converts mpm_flag in to a code number. In step S305, the arithmetic encoding unit 134 applies arithmetic encoding to mpm_flag converted into the code number by the process of step S304, using the context probability model selected by the process of step S303.

In step S306, the VLC table conversion unit 135 converts mpm_lr_flag into a code number. In step S307, the arithmetic encoding unit 136 applies arithmetic encoding to mpm_lr_flag converted into the code number by the process of step S306, using the context probability model selected by the process of step S303.

In step S308, the VLC table conversion unit 137 converts intra_dir_mode into a code number. In step S309, the arithmetic encoding unit 138 applies arithmetic encoding to intra_dir_mode converted into the code number by the process of step S308, using the context probability model selected by the process of step S303.

In step S310, the bit stream generation unit 132 synthesizes the encoded data obtained by the processes of steps S301, S302, S305, S307, and S309 to generate a bit stream.

When the process of step S310 is complete, the bit stream generation unit 132 terminates the lossless encoding process, and returns the process to FIG. 17.

[Flow of Encoding Allocation Control Process]

Next, an example of a flow of the encoding allocation control process executed in step S303 of FIG. 26 will be described with reference to the flowchart of FIG. 27.

When the encoding allocation control process is started, in step S331, the context probability model selection unit 301 of the allocation control unit 121 selects the context probability model for mpm_flag in accordance with the CU size and the partition type.

In step S302, the context probability model selection unit 302 selects the context probability model for mpm_lr_flag in accordance with the partition ID and the partition type.

In step S303, the context probability model selection unit 303 selects the context probability model for intra_dir_mode in accordance with the CU size and the partition type.

Figure 26:
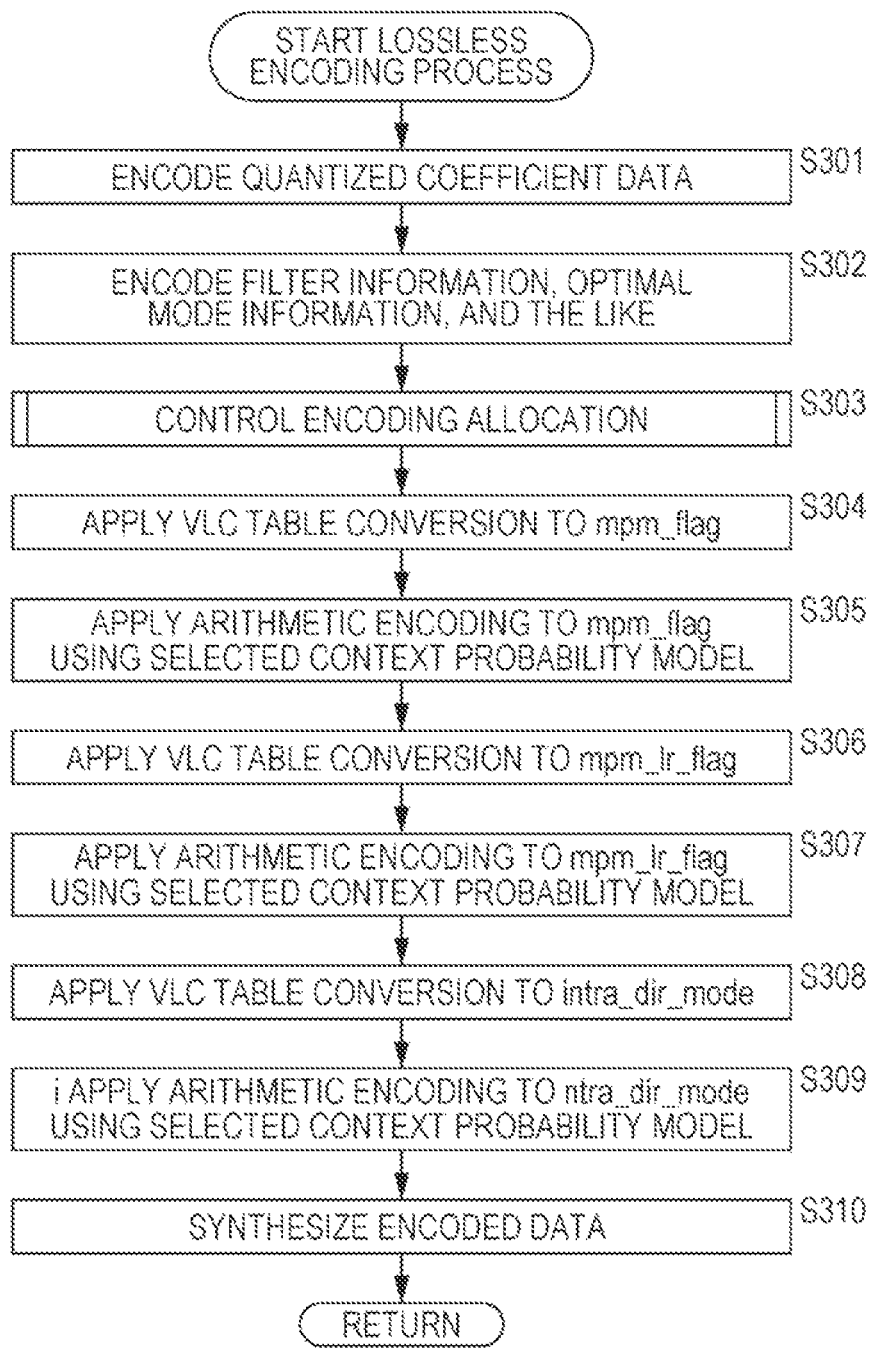
FIG. 26 is a flowchart illustrating an example of a flow of a lossless encoding process.
Figure 27:
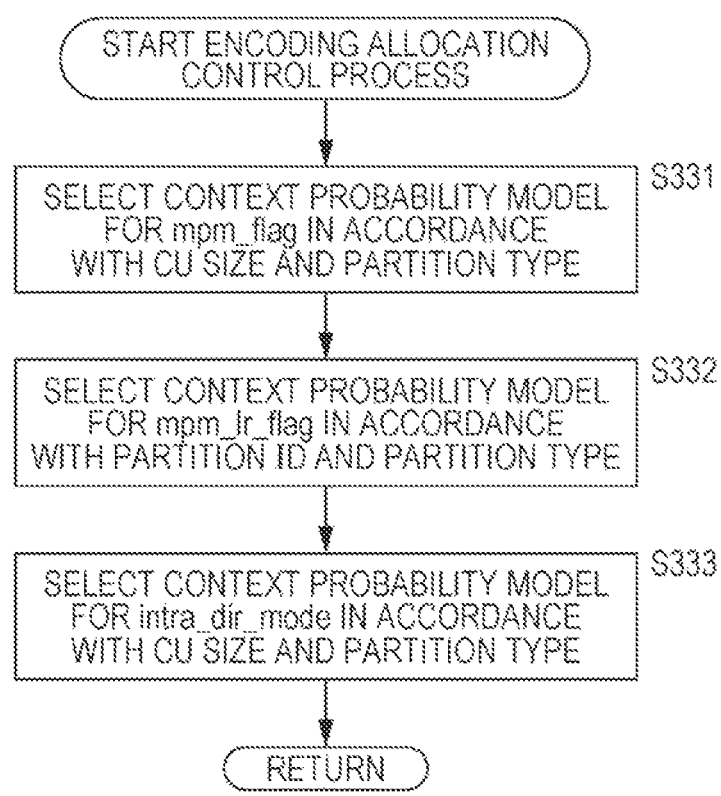
FIG. 27 is a flowchart illustrating an example of a flow of an encoding allocation control process.

When the process of step S303 is complete, the context probability model selection unit 303 terminates the encoding allocation control process, and returns the process to FIG. 26.

By performing the processes as described above, the allocation control unit 121 can select the context probability model for arithmetic encoding so as to improve the encoding efficiency in accordance with the generation frequency of the values of the parameters such as mpm_flag, mpm_lr_flag, and intra_dir_mode based on the size and the shape of the PU. Further, the lossless encoding unit 106 can apply arithmetic encoding to the code numbers of the parameters such as mpm_flag, mpm_lr_flag, and intra_dir_mode using the context probability model.

Accordingly, the image encoding device 100 can suppress the reduction in encoding efficiency due to the parameters related to the intra prediction such as mpm_flag, mpm_lr_flag, and intra_dir_mode.

[Lossless Encoding Unit and Allocation Control Unit]

Figure 28:
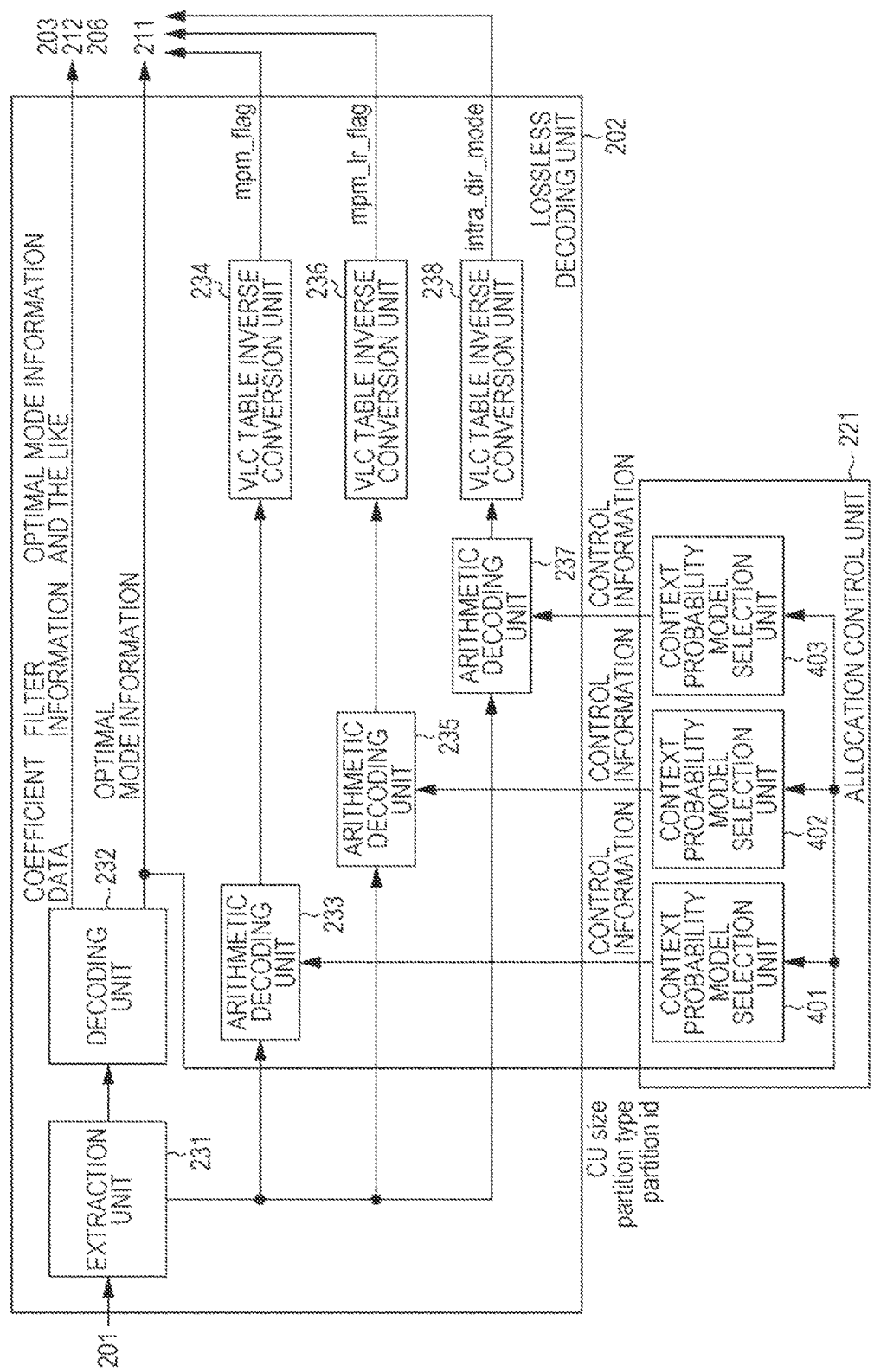
FIG. 28 is a diagram illustrating another configuration example of the lossless decoding unit and the allocation control unit.

FIG. 28 is a block diagram illustrating an example of a main configuration of the lossless decoding unit 202 and the allocation control unit 221 of the image decoding device 200 corresponding to the image encoding device 100 of the example of FIG. 25.

As illustrated in FIG. 28, in this case, the allocation control unit 221 includes context probability model selection units 401 to 403 instead of the table selection units 241 to 243.

The context probability model selection unit 401 controls, similarly to the case of the context probability model selection unit 301, the context probability model to be used in the arithmetic decoding unit 233 based on the CU size and the partition type (information related to the size and the shape of the PU) transmitted from the encoding side.

The context probability model selection unit 402 controls, similarly to the case of the context probability model selection unit 302, the context probability model to be used in the arithmetic decoding unit 235 based on the CU size and the partition type (information related to the size and the shape of the PU) transmitted from the encoding side.

The context probability model selection unit 403 controls, similarly to the case of the context probability model selection unit 303, the context probability model to be used in the arithmetic decoding unit 237 based on the CU size and the partition type (information related to the size and the shape of the PU) transmitted from the encoding side.

Therefore, the arithmetic decoding unit 233, the arithmetic decoding unit 235, and the arithmetic decoding unit 237 respectively performs arithmetic decoding using the context probability models selected by the context probability model selection unit 401, the context probability model selection unit 402, and the context probability model selection unit 403.

In this case, the VLC table inverse conversion unit 234, the VLC table inverse conversion unit 236, and the VLC table inverse conversion unit 238 perform, similarly to the case of FIG. 25, an inverse conversion process without switching the VLC table (using the predetermined VLC table).

Obviously, also in this case, similarly to the case of FIG. 25, only information indicating the context probability models respectively selected by the context probability model selection units 401 to 403 may be supplied to the arithmetic decoding unit 233, the arithmetic decoding unit 235, and the arithmetic decoding unit 237.

[Flow of Lossless Decoding Process]

Figure 29:
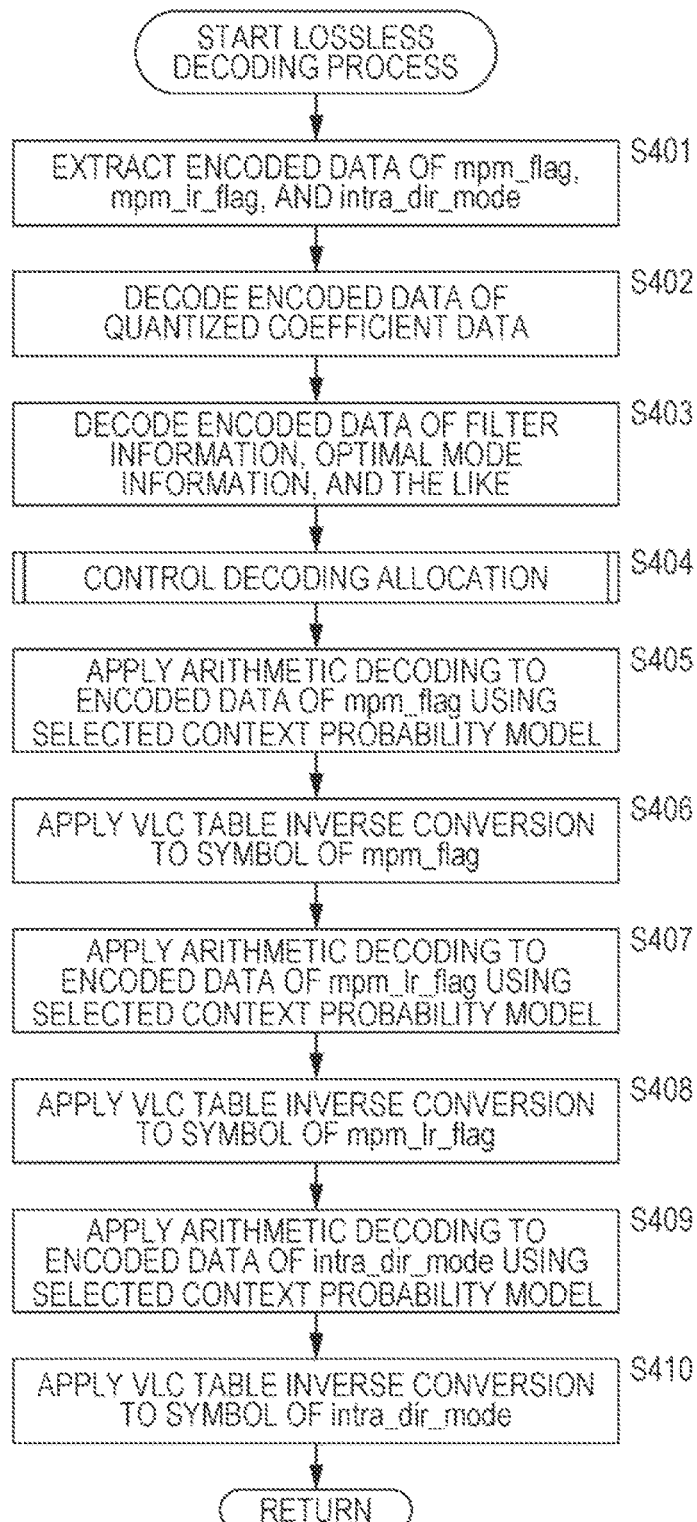
FIG. 29 is a flowchart illustrating another example of the flow of the lossless encoding process.

Next, an example of a flow of a lossless decoding process in this case will be described with reference to the flowchart of FIG. 29.

When a lossless decoding process is started, in step S401, the extraction unit 231 extracts the encoded data of mpm_flag, mpm_lr_flag, and intra_dir_mode from the bit stream.

In step S402, the decoding unit 232 decodes the encoded data of the quantized coefficient data. In step S403, the decoding unit 232 decodes the encoded data of the filter information, the optimal mode information, and the like.

In step S404, the allocation control unit 221 controls the decoding allocation.

In step S405, the arithmetic decoding unit 233 applies arithmetic decoding to the encoded data of mpm_flag extracted in step S231 using the context probability model selected by the process of step S404. In step S406, the VLC table inverse conversion unit 234 inversely converts the code number (symbol) of mpm_flag obtained by being subjected to the arithmetic decoding in step S235 to obtain the value of mpm_flag.

In step S407, the arithmetic decoding unit 235 applies arithmetic decoding to the encoded data of mpm_lr_flag extracted in step S231 using the context probability model selected by the process of step S404. In step S408, the VLC table inverse conversion unit 236 inversely converts the code number (symbol) of mpm_lr_flag obtained by being subjected to the arithmetic decoding in step S407 to obtain the value of mpm_lr_flag.

In step S409, the arithmetic decoding unit 237 applies arithmetic decoding to the encoded data of intra_dir_mode extracted in step S231 using the context probability model selected by the process of step S404. In step S410, the VLC table inverse conversion unit 238 inversely converts the code number (symbol) of mpm_flag obtained by being subjected to the arithmetic decoding in step S409 to obtain the value of intra_dir_mode.

When the process of step S410 is complete, the VLC table inverse conversion unit 238 terminates the lossless decoding process, and returns the process to FIG. 22.

[Flow of Decoding Allocation Control Process]

Figure 30:
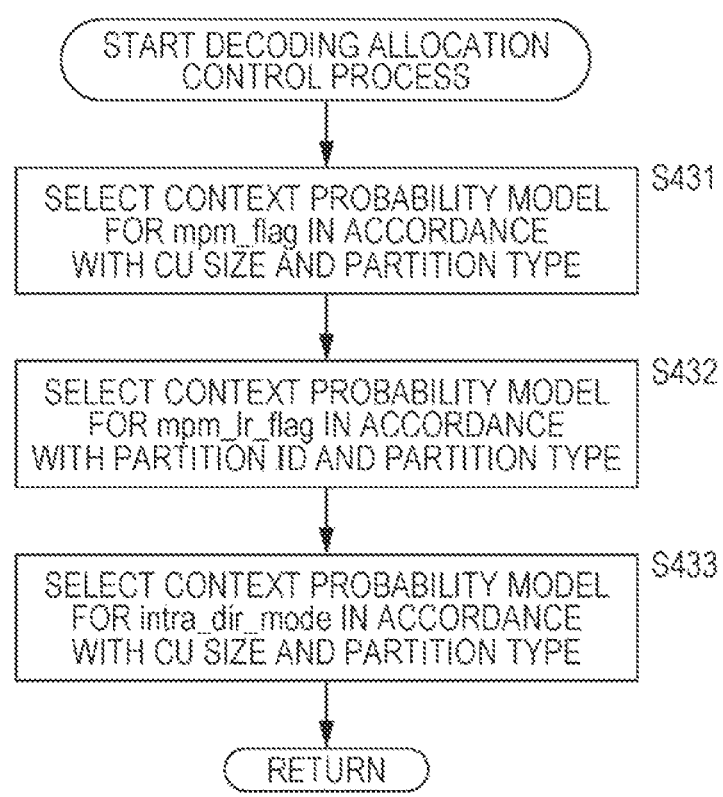
FIG. 30 is a flowchart illustrating another example of the flow of the decoding allocation control process.

Next, an example of a flow of the decoding allocation control process executed in step S404 of FIG. 29 will be described with reference to the flowchart of FIG. 30.

When the decoding allocation control process is started, in step S431, the context probability model selection unit 401 selects the context probability model for mpm_flag in accordance with the CU size and the partition type supplied from the encoding side.

In step S432, the context probability model selection unit 402 selects the context probability model selection unit 401 for mpm_lr_flag in accordance with the partition ID and the partition unit supplied from the encoding side.

In step S433, the context probability model selection unit 403 selects the VLC context probability model for intra_dir_mode in accordance with the CU size and the partition unit supplied from the encoding side. When the process of step S433 is complete, the context probability model selection unit 403 terminates the decoding allocation control process, and returns the process to FIG. 29.

By performing the processes as described above, the lossless decoding unit 202 can correctly decode the encoded bit stream by the lossless encoding unit 106. Accordingly, the image decoding device 200 can suppress the reduction in encoding efficiency due to the parameter related to the intra prediction such as mpm_flag, mpm_lr_flag, and intra_dir_mode.

Note that the deviation of the prediction direction and the values of the parameters described above is an example, and the deviation may be different from the above description as long as it is known. That is, the known deviation may be employed as long as the allocation of the code number and the selection of the context probability model can be performed according to the known deviation. For example, it may be considered such that, in a rectangle PU, the generation frequency of the prediction direction closer to the short direction (direction perpendicular to the longitudinal direction) is increased compared with the generation frequency of the prediction direction closer to the longitudinal direction. Even in such a case, a VLC table that allocates a smaller code number to the prediction direction closer to the short direction of the PU as long as the deviation is known. The same applies to the case of controlling the context probability model.

That is, the above-described allocation method of the code number of the VLC table is an example, and any method may be employed as long as allocation of the code number can further reduce the code amount in accordance with the generation frequency of the values of the parameters. Further, the bit length of the code number is not limited to the above example.

Note that, in determining the size and the shape of the PU (in determining the prediction mode), that is, in generating the cost function value, the allocation of the code number, the context probability models, and the like may be controlled as described above.

Further, in the above description, a case of controlling the values of mpm_flag, mpm_lr_flag, and intra_dir_mode has been described. However, the parameter that controls the code amount may be any parameter, and may be any parameter other than the above.

As with the MPEG and H.26x, for example, the present technique can be applied to an image encoding device and an image decoding device used in receiving image information (bit stream) compressed by the orthogonal transform such as the discrete cosine transform and the motion compensation through a network medium such as satellite broadcasting, cable television, Internet, or a mobile telephone. The present technique can also be applied to an image encoding device and an image decoding device used in performing a process on a storage medium such as an optical disk, a magnetic disk, or a flash memory. Furthermore, the present technique can be applied to a motion prediction compensation device included in these image encoding device and the image decoding device.

4. Fourth Embodiment

[Computer]

The aforementioned series of processes can be executed by hardware or software. A program configuring the software is installed to a computer when the series of processes is executed by the software. The computer here includes a computer incorporated into dedicated hardware and a general-purpose personal computer capable of executing various functions by installing various programs.

Figure 31:
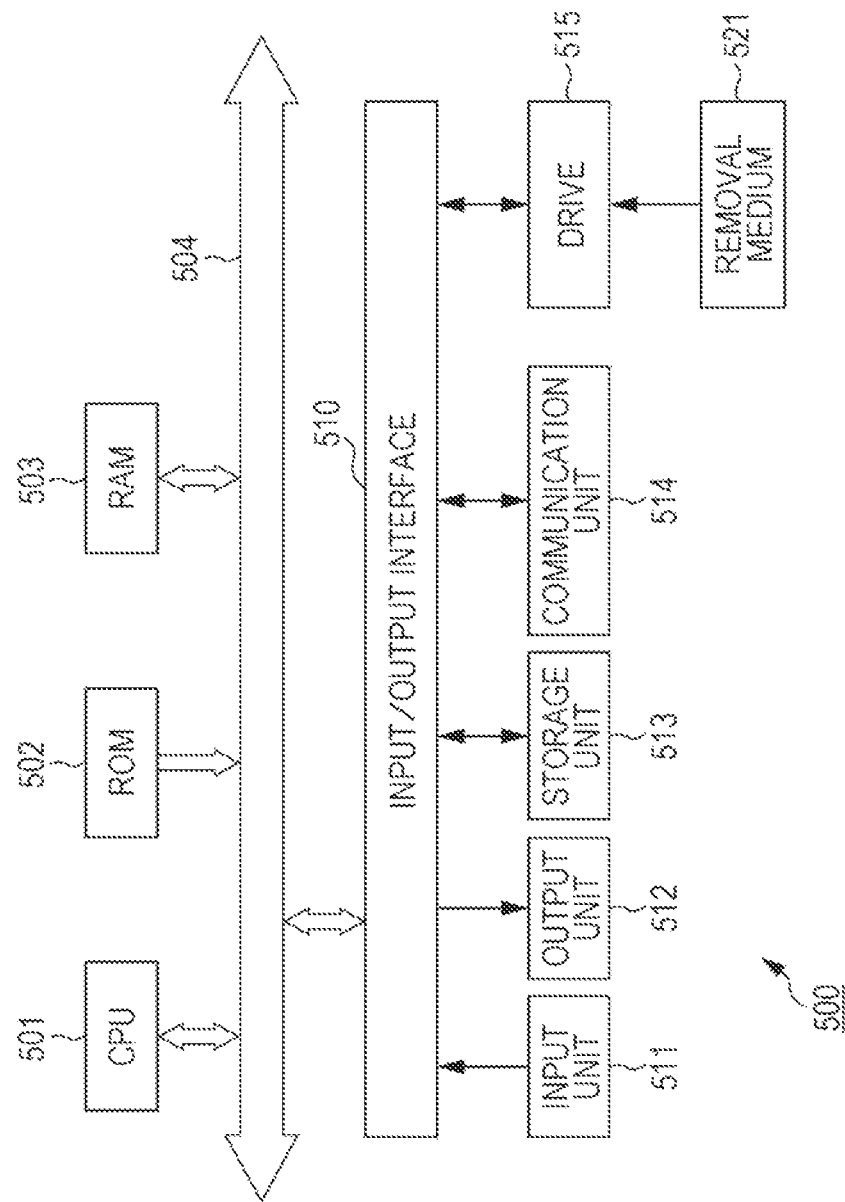
FIG. 31 is a block diagram illustrating an example of a main configuration of a personal computer.

As illustrated in FIG. 31, a CPU (Central Processing Unit) 501 of a personal computer 500 executes various processes according to a program stored in a ROM (Read Only Memory) 502 or a program loaded to a RAM (Random Access Memory) 503 from a storage unit 513. The RAM 503 also stores data or the like necessary for the CPU 501 to execute the various processes, as deemed appropriate.

The CPU 501, the ROM 502, and the RAM 503 are connected to one another via a bus 504. An input/output interface 510 is also connected to the bus 504.

Connected to the input/output interface 510 are an input unit 511 including a keyboard and a mouse, an output unit 512 including a CRT (Cathode Ray Tube) or LCD (Liquid Crystal Display) display and a speaker, the storage unit 513 including a hard disk or the like, and a communication unit 514 including a modem or the like. The communication unit 514 performs a communication process through a network including Internet.

Moreover, a drive 515 is connected to the input/output interface 510 as needed while a removable medium 521 such as a magnetic disk, an optical disk, a magneto-optical disk, or a semiconductor memory is mounted to the drive as appropriate, so that a computer program read out of the medium is installed to the storage unit 513 as needed.

When the aforementioned series of processes is executed by the software, the program configuring the software is installed from the network or a recording medium.

As illustrated in an example in FIG. 31, for example, the recording medium is configured by: the removable medium 521 including the magnetic disk (including a flexible disk), the optical disk (including a CD-ROM (Compact Disc-Read Only Memory) and a DVD (Digital Versatile Disc)), the magneto-optical disk (including an MD (Mini Disc)), or the semiconductor memory in which a program is recorded and which is distributed to deliver the program to a user separately from the device itself; the ROM 502 in which the program is recorded and which is delivered to a user while being incorporated in the device itself in advance; and the hard disk included in the storage unit 513.

Note that the program executed by the computer may be a program performing a process in time series along the order described herein, or a program performing a process in parallel or at a required timing when called, for example.

Furthermore, a step of illustrating the program recorded in the recording medium herein includes not only a process performed in time series along the order described but also a process that is performed in parallel or individually.

A system herein represents the whole device including a plurality of devices.

The configuration described as one device (or processing unit) above may be divided into a plurality of devices (or processing units). To the contrary, the configuration described as the plurality of devices (or processing units) above may be integrated into one device (or processing unit). Moreover, a configuration other than the aforementioned configuration may certainly be added to the configuration of each device (or processing unit). Furthermore, apart of the configuration of some device (or processing unit) may be included in the configuration of another device (or another processing unit) as long as the system-wide configuration and operation are substantially the same. That is, the present technique is not limited to the aforementioned embodiments but can take various changes without departing from the scope of the present technique.

The image encoding device and the image decoding device according to the aforementioned embodiments can be applied to various electronic devices including: a transmitter or a receiver used in cable broadcasting such as the satellite broadcasting and cable TV, distribution on the Internet, or distribution to a terminal in cellular communication; a recording device which records an image into a medium such as the optical disk, the magnetic disk or a flash memory; and a reproduction device which reproduces the image from these storage media. Four application examples will be described below.

5. Fifth Embodiment

First Application Example: Television Set

Figure 32:
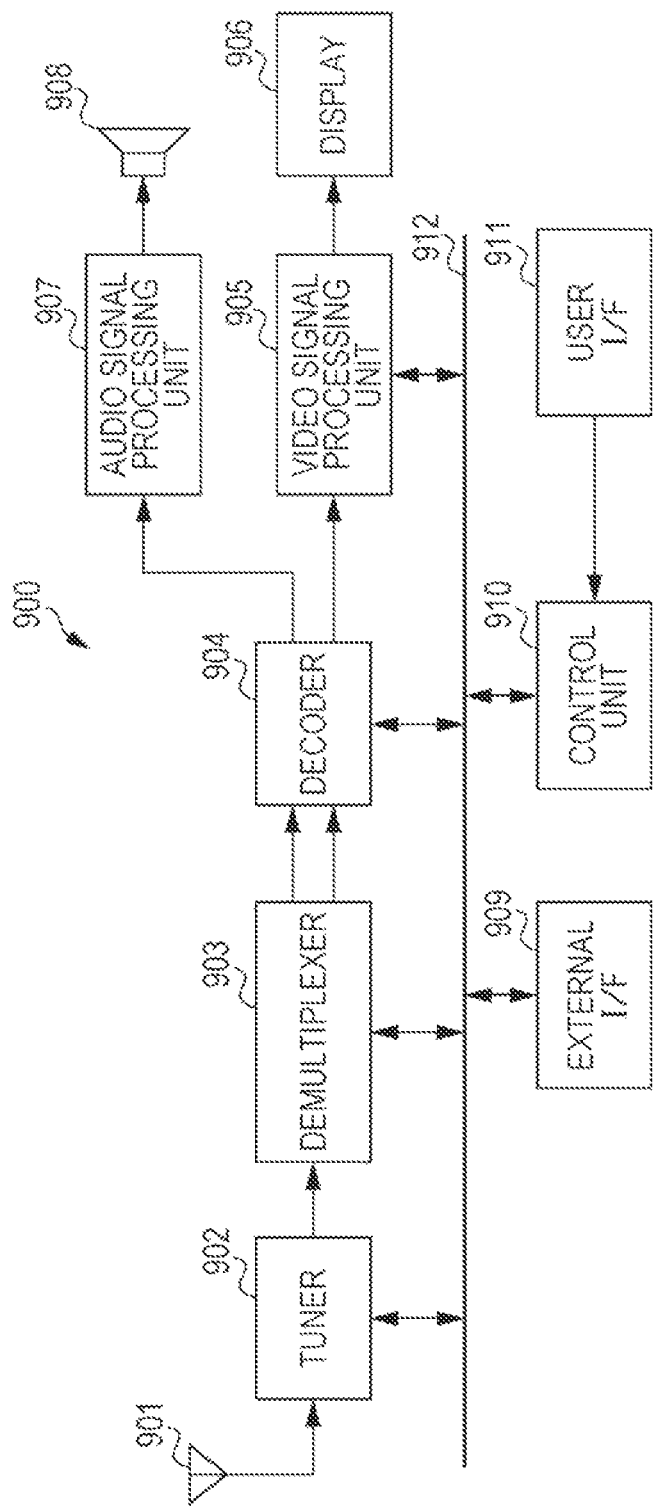
FIG. 32 is a block diagram illustrating an example of a schematic configuration of a television device.

FIG. 32 is a diagram illustrating an example of a schematic configuration of a television device applying the aforementioned embodiment. A television device 900 includes an antenna 901, a tuner 902, a demultiplexer 903, a decoder 904, a video signal processing unit 905, a display 906, an audio signal processing unit 907, a speaker 908, an external interface 909, a control unit 910, a user interface 911, and a bus 912.

The tuner 902 extracts a signal of a desired channel from a broadcast signal received through the antenna 901 and demodulates the extracted signal. The tuner 902 then outputs an encoded bit stream obtained by the demodulation to the demultiplexer 903. That is, the tuner 902 has a role as transmission means receiving the encoded stream in which an image is encoded, in the television device 900.

The demultiplexer 903 isolates a video stream and an audio stream in a program to be viewed from the encoded bit stream and outputs each of the isolated streams to the decoder 904. The demultiplexer 903 also extracts auxiliary data such as an EPG (Electronic Program Guide) from the encoded bit stream and supplies the extracted data to the control unit 910. Here, the demultiplexer 903 may descramble the encoded bit stream when it is scrambled.

The decoder 904 decodes the video stream and the audio stream that are input from the demultiplexer 903. The decoder 904 then outputs video data generated by the decoding process to the video signal processing unit 905. Furthermore, the decoder 904 outputs audio data generated by the decoding process to the audio signal processing unit 907.

The video signal processing unit 905 reproduces the video data input from the decoder 904 and displays the video on the display 906. The video signal processing unit 905 may also display an application screen supplied through the network on the display 906. The video signal processing unit 905 may further perform an additional process such as noise reduction on the video data according to the setting. Furthermore, the video signal processing unit 905 may generate an image of a GUI (Graphical User Interface) such as a menu, a button, or a cursor and superpose the generated image onto the output image.

The display 906 is driven by a drive signal supplied from the video signal processing unit 905 and displays video or an image on a video screen of a display device (such as a liquid crystal display, a plasma display, or an GELD (Organic ElectroLuminescence Display)).

The audio signal processing unit 907 performs a reproducing process such as D/A conversion and amplification on the audio data input from the decoder 904 and outputs the audio from the speaker 908. The audio signal processing unit 907 may also perform an additional process such as noise reduction on the audio data.

The external interface 909 is an interface that connects the television device 900 with an external device or a network. For example, the decoder 904 may decode a video stream or an audio stream received through the external interface 909. This means that the external interface 909 also has a role as the transmission means receiving the encoded stream in which an image is encoded, in the television device 900.

The control unit 910 includes a processor such as a CPU and a memory such as a RAM and a ROM. The memory stores a program executed by the CPU, program data, EPG data, and data acquired through the network. The program stored in the memory is read by the CPU at the start-up of the television device 900 and executed, for example. By executing the program, the CPU controls the operation of the television device 900 in accordance with an operation signal that is input from the user interface 911, for example.

The user interface 911 is connected to the control unit 910. The user interface 911 includes a button and a switch for a user to operate the television device 900 as well as a reception part which receives a remote control signal, for example. The user interface 911 detects a user operation through these components, generates the operation signal, and outputs the generated operation signal to the control unit 910.

The bus 912 mutually connects the tuner 902, the demultiplexer 903, the decoder 904, the video signal processing unit 905, the audio signal processing unit 907, the external interface 909, and the control unit 910.

The decoder 904 in the television device 900 configured in the aforementioned manner has a function of the image decoding device according to the aforementioned embodiment. Accordingly, the encoding efficiency can be improved in decoding an image by the television device 900.

6. Sixth Embodiment

Second Application Example: Mobile Telephone

Figure 33:
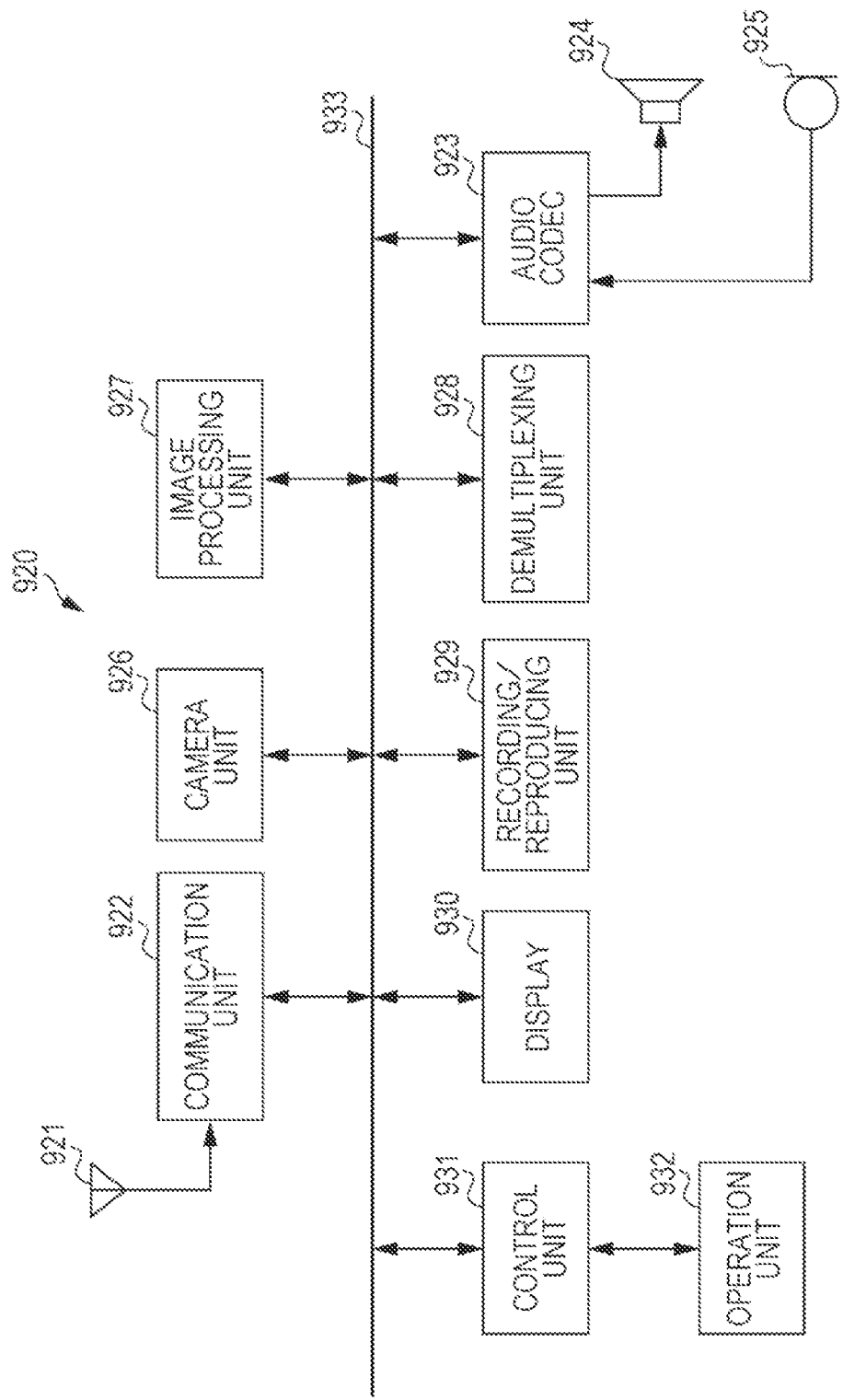
FIG. 33 is a block diagram illustrating an example of a schematic configuration of a mobile telephone.

FIG. 33 is a diagram illustrating an example of a schematic configuration of a mobile telephone applying the aforementioned embodiment. A mobile telephone 920 includes an antenna 921, a communication unit 922, an audio codec 923, a speaker 924, a microphone 925, a camera unit 926, an image processing unit 927, a demultiplexing unit 928, a recording/reproducing unit 929, a display 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 mutually connects the communication unit 922, the audio codec 923, the camera unit 926, the image processing unit 927, the demultiplexing unit 928, the recording/reproducing unit 929, the display 930, and the control unit 931.

The mobile telephone 920 performs an operation such as transmitting/receiving an audio signal, transmitting/receiving an electronic mail or image data, imaging an image, or recording data in various operation modes including an audio call mode, a data communication mode, a photography mode, and a videophone mode.

In the audio call mode, an analog audio signal generated by the microphone 925 is supplied to the audio codec 923. The audio codec 923 then converts the analog audio signal into audio data, performs A/D conversion on the converted audio data, and compresses the data. The audio codec 923 thereafter outputs the compressed audio data to the communication unit 922. The communication unit 922 encodes and modulates the audio data to generate a transmission signal. The communication unit 922 then transmits the generated transmission signal to a base station (not shown) through the antenna 921. Furthermore, the communication unit 922 amplifies a radio signal received through the antenna 921, converts a frequency of the signal, and acquires a reception signal. The communication unit 922 thereafter demodulates and decodes the reception signal to generate the audio data and output the generated audio data to the audio codec 923. The audio codec 923 expands the audio data, performs D/A conversion on the data, and generates the analog audio signal. The audio codec 923 then outputs the audio by supplying the generated audio signal to the speaker 924.

In the data communication mode, for example, the control unit 931 generates character data configuring an electronic mail, in accordance with a user operation through the operation unit 932. The control unit 931 further displays a character on the display 930. Moreover, the control unit 931 generates electronic mail data in accordance with a transmission instruction from a user through the operation unit 932 and outputs the generated electronic mail data to the communication unit 922. The communication unit 922 encodes and modulates the electronic mail data to generate a transmission signal. The communication unit 922 then transmits the generated transmission signal to a base station (not shown) through the antenna 921. Furthermore, the communication unit 922 amplifies a radio signal received through the antenna 921, converts a frequency of the signal, and acquires a reception signal. The communication unit 922 thereafter demodulates and decodes the reception signal, restores the electronic mail data, and outputs the restored electronic mail data to the control unit 931. The control unit 931 displays the content of the electronic mail on the display 930 as well as stores the electronic mail data in a storage medium of the recording/reproducing unit 929.

The recording/reproducing unit 929 includes an arbitrary storage medium that is readable and writable. For example, the storage medium may be a built-in storage medium such as a RAM or a flash memory, or may be an externally-mounted storage medium such as a hard disk, a magnetic disk, a magneto-optical disk, an optical disk, a USB (Unallocated Space Bitmap) memory, or a memory card.

In the photography mode, for example, the camera unit 926 images an object, generates image data, and outputs the generated image data to the image processing unit 927. The image processing unit 927 encodes the image data input from the camera unit 926 and stores an encoded stream in the storage medium of the storing/reproducing unit 929.

In the videophone mode, for example, the demultiplexing unit 928 multiplexes a video stream encoded by the image processing unit 927 and an audio stream input from the audio codec 923, and outputs the multiplexed stream to the communication unit 922. The communication unit 922 encodes and modulates the stream to generate a transmission signal. The communication unit 922 then transmits the generated transmission signal to a base station (not shown) through the antenna 921. Furthermore, the communication unit 922 amplifies a radio signal received through the antenna 921, converts a frequency of the signal, and acquires a reception signal. The transmission signal and the reception signal can include an encoded bit stream. Then, the communication unit 922 demodulates and decodes the reception signal to restore the stream, and outputs the restored stream to the demultiplexing unit 928. The demultiplexing unit 928 isolates the video stream and the audio stream from the input stream and outputs the video stream and the audio stream to the image processing unit 927 and the audio codec 923, respectively. The image processing unit 927 decodes the video stream to generate video data. The video data is then supplied to the display 930, which displays a series of images. The audio codec 923 expands and performs D/A conversion on the audio stream to generate an analog audio signal. The audio codec 923 then outputs the audio by supplying the generated audio signal to the speaker 924.

The image processing unit 927 in the mobile telephone 920 configured in the aforementioned manner has a function of the image encoding device and the image decoding device according to the aforementioned embodiment. Accordingly, the encoding efficiency can be improved in encoding and decoding an image by the mobile telephone 920.

7. Seventh Embodiment

Third Application Example: Recording/Reproducing Device

Figure 34:
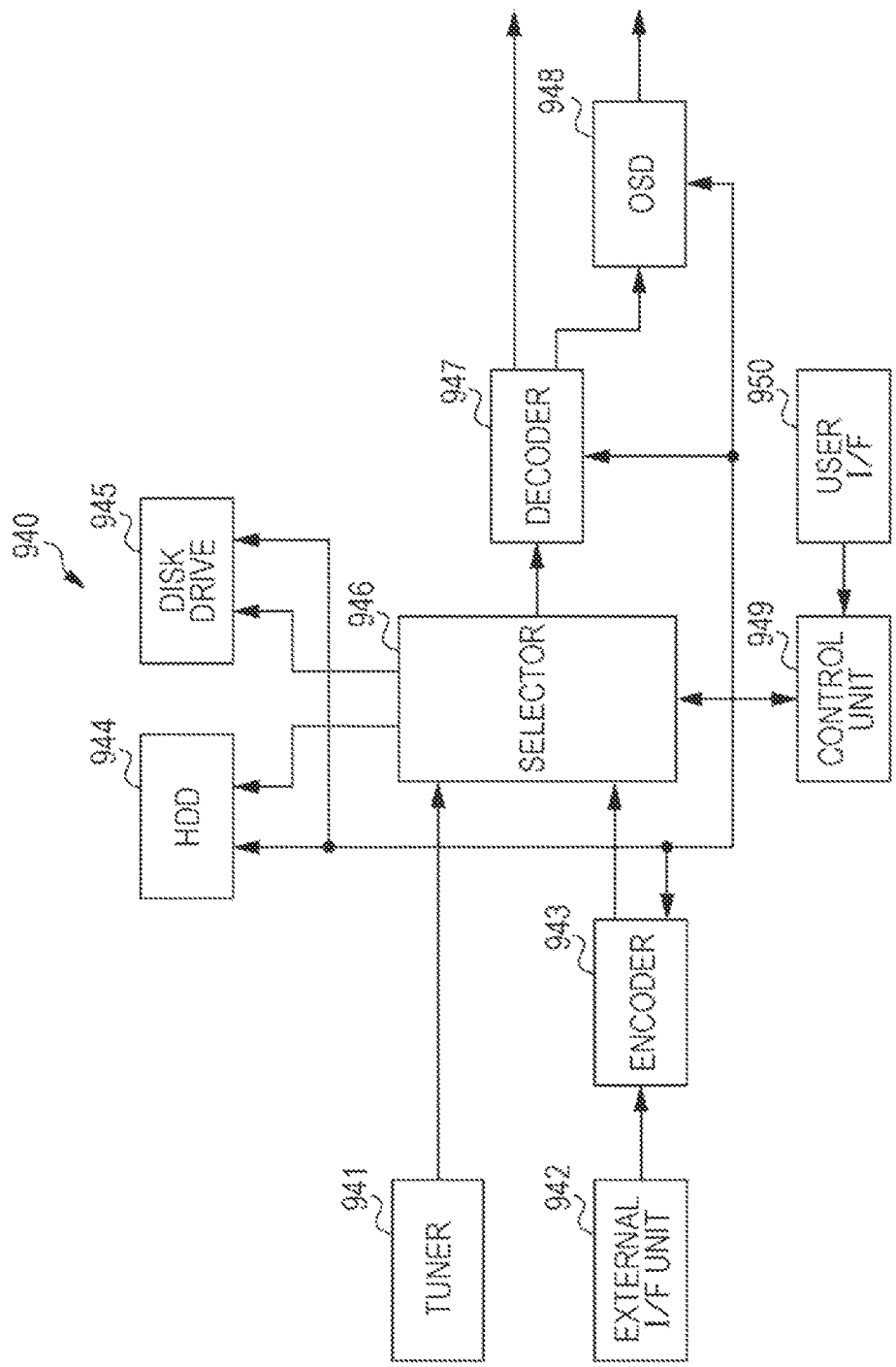
FIG. 34 is a block diagram illustrating an example of a schematic configuration of a recording/reproducing device.

FIG. 34 is a diagram illustrating an example of a schematic configuration of a recording/reproducing device applying the aforementioned embodiment. A recording/reproducing device 940 encodes audio data and video data of a broadcast program received and records the data into a recording medium, for example. The recording/reproducing device 940 may also encode audio data and video data acquired from another device and record the data into the recording medium, for example. In response to a user instruction, for example, the recording/reproducing device 940 reproduces the data recorded in the recording medium on a monitor and a speaker. The recording/reproducing device 940 at this time decodes the audio data and the video data.

The recording/reproducing device 940 includes a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal of a desired channel from a broadcast signal received through an antenna (not shown) and demodulates the extracted signal. The tuner 941 then outputs an encoded bit stream obtained by the demodulation to the selector 946. That is, the tuner 941 has a role as transmission means in the recording/reproducing device 940.

The external interface 942 is an interface which connects the recording/reproducing device 940 with an external device or a network. The external interface 942 may be, for example, an IEEE 1394 interface, a network interface, a USB interface, or a flash memory interface. The video data and the audio data received through the external interface 942 are input to the encoder 943, for example. That is, the external interface 942 has a role as transmission means in the recording/reproducing device 940.

The encoder 943 encodes the video data and the audio data when the video data and the audio data input from the external interface 942 are not encoded. The encoder 943 thereafter outputs an encoded bit stream to the selector 946.

The HDD 944 records, into an internal hard disk, the encoded bit stream in which content data such as video and audio is compressed, various programs, and other data. The HDD 944 reads these data from the hard disk when reproducing the video and the audio.

The disk drive 945 records and reads data into/from a recording medium which is mounted to the disk drive. The recording medium mounted to the disk drive 945 may be, for example, a DVD disk (such as DVD-Video, DVD-RAM, DVD-R, DVD-RW, DVD+R, or DVD+RW) or a Blu-ray (Registered Trademark) disk.

The selector 946 selects the encoded bit stream input from the tuner 941 or the encoder 943 when recording the video and audio, and outputs the selected encoded bit stream to the HDD 944 or the disk drive 945. When reproducing the video and audio, on the other hand, the selector 946 outputs the encoded bit stream input from the HDD 944 or the disk drive 945 to the decoder 947.

The decoder 947 decodes the encoded bit stream to generate the video data and the audio data. Then, the decoder 947 outputs the generated video data to the OSD 948. In addition, the decoder 904 outputs the generated audio data to a speaker outside.

The OSD 948 reproduces the video data input from the decoder 947 and displays the video. The OSD 948 may also superpose an image of a GUI such as a menu, a button, or a cursor onto the video displayed.

The control unit 949 includes a processor such as a CPU and a memory such as a RAM and a ROM. The memory stores a program executed by the CPU as well as program data. The program stored in the memory is read by the CPU at the start-up of the recording/reproducing device 940 and executed, for example. By executing the program, the CPU controls the operation of the recording/reproducing device 940 in accordance with an operation signal that is input from the user interface 950, for example.

The user interface 950 is connected to the control unit 949. The user interface 950 includes a button and a switch for a user to operate the recording/reproducing device 940 as well as a reception part which receives a remote control signal, for example. The user interface 950 detects a user operation through these components, generates the operation signal, and outputs the generated operation signal to the control unit 949.

The encoder 943 in the recording/reproducing device 940 configured in the aforementioned manner has a function of the image encoding device according to the aforementioned embodiment. On the other hand, the decoder 947 has a function of the image decoding device according to the aforementioned embodiment. Accordingly, the encoding efficiency in encoding and decoding an image by the recording/reproducing device 940 can be improved.

8. Eighth Embodiment

Fourth Application Example: Imaging Device

FIG. 35 is a diagram illustrating an example of a schematic configuration of an imaging device applying the aforementioned embodiment. An imaging device 960 images an object, generates an image, encodes image data, and records the data into a recording medium.

The imaging device 960 includes an optical block 961, an imaging unit 962, a signal processing unit 963, an image processing unit 964, a display 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display 965 is connected to the image processing unit 964. The user interface 971 is connected to the control unit 970. The bus 972 mutually connects the image processing unit 964, the external interface 966, the memory 967, the media drive 968, the OSD 969, and the control unit 970.

The optical block 961 includes a focus lens and a diaphragm mechanism. The optical block 961 forms an optical image of the object on an imaging surface of the imaging unit 962. The imaging unit 962 includes an image sensor such as a CCD (Charge Coupled Device) or a CMOS (Complementary Metal Oxide Semiconductor) and performs photoelectric conversion to convert the optical image formed on the imaging surface into an image signal as an electric signal. Subsequently, the imaging unit 962 outputs the image signal to the signal processing unit 963.

The signal processing unit 963 performs various camera signal processes such as a knee correction, a gamma correction and a color correction on the image signal input from the imaging unit 962. The signal processing unit 963 outputs the image data, on which the camera signal process has been performed, to the image processing unit 964.

The image processing unit 964 encodes the image data input from the signal processing unit 963 and generates the encoded data. The image processing unit 964 then outputs the generated encoded data to the external interface 966 or the media drive 968. The image processing unit 964 also decodes the encoded data input from the external interface 966 or the media drive 968 to generate image data. The image processing unit 964 then outputs the generated image data to the display 965. Moreover, the image processing unit 964 may output to the display 965 the image data input from the signal processing unit 963 to display the image. Furthermore, the image processing unit 964 may superpose display data acquired from the OSD 969 onto the image that is output on the display 965.

The OSD 969 generates an image of a GUI such as a menu, a button, or a cursor and outputs the generated image to the image processing unit 964.

The external interface 966 is configured as a USB input/output terminal, for example. The external interface 966 connects the imaging device 960 with a printer when printing an image, for example. Moreover, a drive is connected to the external interface 966 as needed. A removable medium such as a magnetic disk or an optical disk is mounted to the drive, for example, so that a program read from the removable medium can be installed to the imaging device 960. The external interface 966 may also be configured as a network interface that is connected to a network such as a LAN or the Internet. That is, the external interface 966 has a role as transmission means in the imaging device 960.

The recording medium mounted to the media drive 968 may be an arbitrary removable medium that is readable and writable such as a magnetic disk, a magneto-optical disk, an optical disk, or a semiconductor memory. Furthermore, the recording medium may be fixedly mounted to the media drive 968 so that a non-transportable storage unit such as a built-in hard disk drive or an SSD (Solid State Drive) is configured, for example.

The control unit 970 includes a processor such as a CPU and a memory such as a RAM and a ROM. The memory stores a program executed by the CPU as well as program data. The program stored in the memory is read by the CPU at the start-up of the imaging device 960 and then executed. By executing the program, the CPU controls the operation of the imaging device 960 in accordance with an operation signal that is input from the user interface 971, for example.

The user interface 971 is connected to the control unit 970. The user interface 971 includes a button and a switch for a user to operate the imaging device 960, for example. The user interface 971 detects a user operation through these components, generates the operation signal, and outputs the generated operation signal to the control unit 970.

The image processing unit 964 in the imaging device 960 configured in the aforementioned manner has a function of the image encoding device and the image decoding device according to the aforementioned embodiment. Accordingly, the encoding efficiency can be improved in encoding and decoding an image in the imaging device 960.

Note that, in the present specification, an example has been described, in which various types of information such as a threshold are multiplexed to a header of an encoded stream, and are transmitted from the encoding side to the decoding side. The method of transmitting these pieces of information however is not limited to such example. For example, these pieces of information may be transmitted or recorded as separate data associated with the encoded bit stream without being multiplexed to the encoded bit stream. Here, the term "association" means to allow the image included in the bit stream (may be a part of the image such as a slice or a block) and the information corresponding to the current image to establish a link when decoding. Namely, the information may be transmitted on a different transmission path from the image (or the bit stream). The information may also be recorded in a different recording medium (or a different recording area in the same recording medium) from the image (or the bit stream). Furthermore, the information and the image (or the bit stream) may be associated with each other by an arbitrary unit such as a plurality of frames, one frame, or a portion within a frame.

While the preferred embodiments of the present disclosure have been described in detail with reference to the attached drawings, the present disclosure is not to be limited to such examples. It is apparent that those having ordinary skill in the art to which the present disclosure pertains can make various changes or modifications within the scope of the technical idea described in claims, whereby it is to be understood that these changes or modifications certainly pertain to the technical scope of the present disclosure.

Note that the present technique can also employ configurations such as those shown below.

(1) An image processing apparatus, including:
a control unit configured to control encoding of a parameter related to intra prediction in accordance with a region in a prediction processing unit; and
an encoding unit configured to encode the parameter according to control by the control unit.

(2) The image processing apparatus according to (1), wherein the control unit controls encoding of the parameter so as to reduce a code amount of the parameter.

(3) The image processing apparatus according to (1) or (2), wherein the control unit selects a table for allocating a code number to each value of the parameter, and
the encoding unit converts and encodes each value of the parameter into the code number using the table selected by the control unit.

(4) The image processing apparatus according to any of (1) to (3), wherein the control unit selects a context probability model for arithmetic encoding by the encoding unit, and
the encoding unit encodes the parameter using the context probability model selected by the control unit.

(5) The image processing apparatus according to any of (1) to (4), wherein the parameter includes a flag specifying whether a most probable mode (MPM) is used.

(6) The image processing apparatus according to (5), wherein the control unit controls encoding of the flag specifying whether the MPM is used, in accordance with a size and a shape of the region.

(7) The image processing apparatus according to any of (1) to (6), wherein the parameter includes a flag specifying a surrounding region to be referred in the most probable mode (MPM).

(8) The image processing apparatus according to (7), wherein the control unit controls encoding of the flag specifying a surrounding region to be referred in the MPM, in accordance with a shape and an ID of the region.

(9) The image processing apparatus according to any of (1) to (8), wherein the parameter includes a flag indicating a prediction direction of the intra prediction.

(10) The image processing apparatus according to (9), wherein the control unit controls encoding of the flag indicating a prediction direction of the intra prediction, in accordance with a size and a shape of the region.

(11) The image processing apparatus according to any of (1) to (10), further including:
a transmission unit configured to transmit the parameter encoded by the encoding unit.

(12) A method of processing an image in an image processing apparatus, wherein
a control unit controls encoding of a parameter related to intra prediction in accordance with a region in a prediction processing unit, and
an encoding unit encodes the parameter according to the control.

(13) An image processing apparatus, including:
a reception unit configured to receive encoded data of a parameter related to intra prediction;
a control unit configured to control decoding of the encoded data received by the reception unit, in accordance with a region in a prediction processing unit; and
a decoding unit configured to decode the encoded data according to control by the control unit.

(14) A method of processing an image in an image processing apparatus, wherein
a reception unit receives encoded data of a parameter related to intra prediction,
a control unit controls decoding of the received encoded data, in accordance with a region in a prediction processing unit, and
a decoding unit decodes the encoded data according to the control.

REFERENCE SIGNS LIST

100 Image encoding device
106 Lossless encoding unit
121 Allocation control unit
133, 135, and 137 VLC table conversion unit
141 to 143 Table selection unit
200 Image decoding device
202 Lossless decoding unit
221 Allocation control unit
234, 236, and 238 VLC table inverse conversion unit
241 to 243 Table selection unit
301 to 303 Context probability model selection unit
401 to 403 Context probability model selection unit

The invention claimed is:
1. An image processing apparatus, comprising:
a control unit configured to control encoding of a parameter related to intra prediction based on a size and a shape of each region of a plurality of regions in a prediction processing unit, wherein a code amount of the encoding of the parameter for each region is based on deviation of a generation frequency of the parameter for each region, wherein the deviation of the generation frequency is determined according to the size and the shape of each region; and
an encoding unit configured to encode the parameter according to control by the control unit, wherein the control unit and the encoding unit are each implemented via at least one processor.

2. The image processing apparatus according to claim 1, wherein the control unit selects a table for allocating a code number to each value of the parameter based on the size and the shape of the region in the prediction processing unit, and the encoding unit converts and encodes each value of the parameter into the code number using the table selected by the control unit.

3. The image processing apparatus according to claim 1, wherein the control unit selects a context probability model for arithmetic encoding by the encoding unit based on the size and the shape of the region in the prediction processing unit, and the encoding unit encodes the parameter using the context probability model selected by the control unit.

4. The image processing apparatus according to claim 1, wherein the parameter includes a flag specifying whether a most probable mode (MPM) is used.

5. The image processing apparatus according to claim 4, wherein the control unit controls encoding of the flag specifying whether the MPM is used, based on the size and the shape of the region in the prediction processing unit.

6. The image processing apparatus according to claim 1, wherein the parameter includes a flag specifying a surrounding region to be referred in a most probable mode (MPM).

7. The image processing apparatus according to claim 6, wherein the control unit controls encoding of the flag specifying the surrounding region to be referred in the MPM, based on the shape and an ID of the region in the prediction processing unit.

8. The image processing apparatus according to claim 1, wherein the parameter includes a flag indicating a prediction direction of the intra prediction.

9. The image processing apparatus according to claim 8, wherein the control unit controls encoding of the flag indicating the prediction direction of the intra prediction, based on the size and the shape of the region in the prediction processing unit.

10. The image processing apparatus according to claim 1, further comprising:
    a transmission unit configured to transmit the parameter encoded by the encoding unit.

11. A method of processing an image in an image processing apparatus, the method being performed via at least one processor, wherein a control unit controls encoding of a parameter related to intra prediction based on a size and a shape of each region of a plurality of regions in a prediction processing unit, wherein a code amount of the encoding of the parameter for each region is based on deviation of a generation frequency of the parameter for each region, wherein the deviation of the generation frequency is determined according to the size and the shape of each region, and an encoding unit encodes the parameter according to the control.

12. An image processing apparatus, comprising:
a reception unit configured to receive encoded data of a parameter related to intra prediction;
a control unit configured to control decoding of the encoded data received by the reception unit, based on a size and a shape of each region of a plurality of regions in a prediction processing unit, wherein a code amount of the encoded data of the parameter for each region is based on deviation of a generation frequency of the parameter for each region, wherein the deviation of the generation frequency is determined according to the size and the shape of each region; and
a decoding unit configured to decode the encoded data according to control by the control unit,
wherein the reception unit, the control unit, and the decoding unit are each implemented via at least one processor.

13. A method of processing an image in an image processing apparatus, the method being performed via at least one processor, wherein a reception unit receives encoded data of a parameter related to intra prediction, a control unit controls decoding of the received encoded data, based on a size and a shape of each region of a plurality of regions in a prediction processing unit, wherein a code amount of the encoded data of the parameter for each region is based on deviation of a generation frequency of the parameter for each region, wherein the deviation of the generation frequency is determined according to the size and the shape of each region, and a decoding unit decodes the encoded data according to the control.

* * * * *